United States Patent
Desroches et al.

(10) Patent No.: US 10,700,953 B2
(45) Date of Patent: *Jun. 30, 2020

(54) METHODS AND SYSTEMS FOR MONITORING A SERVICE PROVIDED OVER A PACKET-SWITCHED NETWORK

(71) Applicant: BCE Inc., Verdun (CA)

(72) Inventors: Michael H. Desroches, Brantford (CA); Constantin Tivig, Verdun (CA); Chris Snyder, Verdun (CA); Ferris Eng, Verdun (CA)

(73) Assignee: BCE INC., Verdun (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,066

(22) Filed: Apr. 8, 2019

(65) Prior Publication Data

US 2019/0306041 A1 Oct. 3, 2019

Related U.S. Application Data

(63) Continuation of application No. 15/299,587, filed on Oct. 21, 2016, now Pat. No. 10,257,062, which is a
(Continued)

(51) Int. Cl.
*H04L 12/26* (2006.01)
*H04L 12/24* (2006.01)
(Continued)

(52) U.S. Cl.
CPC ...... *H04L 43/0847* (2013.01); *H04L 41/5067* (2013.01); *H04N 17/004* (2013.01);
(Continued)

(58) Field of Classification Search
CPC ............ H04L 43/0847; H04L 41/5067; H04N 21/6375; H04N 17/004; H04N 21/24
See application file for complete search history.

(56) References Cited

U.S. PATENT DOCUMENTS 6,392,993 B1    5/2002  Hamilton et al.
9,479,411 B2 *  10/2016 Desroches .......... H04L 41/5067
(Continued)

FOREIGN PATENT DOCUMENTS

| | | |
|---|---|---|
| CN | 101142691 | 3/2008 |
| CN | 101159635 | 4/2008 |
| CN | 101170691 | 4/2008 |

OTHER PUBLICATIONS

International Search Report issued by the Canadian Intellectual Property Office in International Application No. PCT/CA2011/000815 dated Apr. 5, 2012, 4 pages.
(Continued)

*Primary Examiner* — Omer S Mian
(74) *Attorney, Agent, or Firm* — Pearne & Gordon LLP

(57) ABSTRACT

Methods and systems for monitoring a service provided over a packet-switched network, such as an Internet Protocol television (IPTV) service, an Internet access service, or a voice-over-Internet-Protocol (VoIP) telephony service. Various parameters related to the service (e.g., parameters indicative of packet loss, packet corruption, or other packet error) are determined and used to assess various aspects of the service and/or network over which the service is delivered, including a quality of experience (QoE) of subscribers.

17 Claims, 9 Drawing Sheets

Related U.S. Application Data continuation of application No. 13/974,577, filed on Aug. 23, 2013, now Pat. No. 9,479,411, which is a continuation of application No. 13/809,715, filed as application No. PCT/CA2011/000815 on Jul. 12, 2011, now abandoned.

(60) Provisional application No. 61/363,441, filed on Jul. 12, 2010, provisional application No. 61/391,974, filed on Oct. 11, 2010.

(51) Int. Cl.
  *H04N 17/00* (2006.01)
  *H04N 21/24* (2011.01)
  *H04N 21/442* (2011.01)
  *H04N 21/6375* (2011.01)
  *H04N 21/643* (2011.01)
  *H04N 21/61* (2011.01)
  *H04N 21/647* (2011.01)

(52) U.S. Cl.
  CPC ........... *H04N 21/24* (2013.01); *H04N 21/442* (2013.01); *H04N 21/6125* (2013.01); *H04N 21/6375* (2013.01); *H04N 21/64322* (2013.01); *H04N 21/64738* (2013.01); *H04L 43/0835* (2013.01)

(56) References Cited

U.S. PATENT DOCUMENTS

| | | | |
|---|---|---|---|
| 10,257,062 B2* | 4/2019 | Desroches | H04L 41/5067 |
| 2003/0067872 A1* | 4/2003 | Harrell | H04L 29/06027 |
| | | | 370/229 |
| 2003/0123466 A1 | 7/2003 | Somekh et al. | |
| 2006/0171356 A1 | 8/2006 | Gurelli et al. | |
| 2007/0058546 A1 | 3/2007 | Na | |
| 2008/0155087 A1* | 6/2008 | Blouin | H04L 41/5006 |
| | | | 709/223 |
| 2008/0201752 A1 | 8/2008 | Liu et al. | |
| 2009/0125953 A1 | 5/2009 | Porter et al. | |
| 2010/0265862 A1 | 10/2010 | Choi et al. | |

OTHER PUBLICATIONS

Written Opinion of the International Searching Authority issued by the Canadian Intellectual Property Office in International Application No. PCT/CA2011/000815 dated Apr. 5, 2012, 5 pages.
TR-135, "Data Model for a TR-069 Enabled STB", Broadband Forum Technical Report, pp. 1-114, Dec. 2007, pp. 17, 18, 26-87, 93-104; Figs. 1, 2; Table 1.
TR-160, "IPTV Performance Monitoring", Broadband Forum Technical Report, pp. 1-42, Nov. 2010, pp. 17-42; Fig. 1.
ATIS-0800008, "QoS Metrics for linear Broadcast IPTV", ATIS (Alliance for Telecommunications Industry Solutions) standard developed by the Quality of Services Metrics (QoSM) Task Force of the ATIS IPTV Interoperability Forum (IIF), pp. 1-27, 2007.
TR-126, "Triple-play Services Quality of Experience (QoE Requirements", DSL Forum Technical Report, pp. 1-123, Dec. 13, 2006.
Begen, A.C. et al, "On the Use of RTP for Monitoring and Fault Isolation in IPTV", IEEE Network, pp. 14-19, Mar.-Apr. 2010.
Luo, C. et al, "Monitoring and Troubleshooting in Operational IP-TV System", IEEE Transactions on Broadcasting, col. 53, No. 3, pp. 711-718, Sep. 2007.

* cited by examiner

| Date | Customer Count | Green | Yellow | Red | Prime |
|---|---|---|---|---|---|
| ☐ MONTH (2 Items) | | | | | |
| Sat. 1 May 2010 00:00:00... | 2,682 | 96.01% | 3.84% | 0.04% | 0.11% |
| Thu. 1 May 2010 00:00:00... | 2,692 | 99.26% | 0.19% | 0.41% | 0.15% |
| ☐ WEEK (5 Items) | | | | | |
| Sun. 16 May 2010 00:00:... | 2,626 | 67.44% | 22.58% | 6.28% | 3.69% |
| Sun. 9 May 2010 00:00:0... | 2,651 | 97.96% | 1.74% | 0.04% | 0.26% |
| Sun. 2 May 2010 00:00:0... | 2,651 | 98.91% | 0.87% | 0.04% | 0.19% |
| Sun. 25 May 2010 00:00:... | 2,650 | 98.15% | 1.47% | 0.23% | 0.15% |
| Sun. 18 May 2010 00:00:... | 2,637 | 96.93% | 2.16% | 0.53% | 0.38% |
| ☐ DAY (7 Items) | | | | | |
| Tue. 18 May 2010 00:00:... | 2,608 | 84.05% | 2.45% | 6.86% | 6.63% |
| Mon. 17 May 2010 00:00:... | 2,620 | 78.97% | 5.04% | 8.44% | 7.56% |
| Sun. 16 May 2010 00:00:... | 2,631 | 82.90% | 2.70% | 6.65% | 7.75% |
| Sat. 15 May 2010 00:00:0... | 2,633 | 95.97% | 2.66% | 0.38% | 0.99% |

METHODS AND SYSTEMS FOR MONITORING A SERVICE PROVIDED OVER A PACKET-SWITCHED NETWORK

FIELD OF THE INVENTION

The invention relates generally to services delivered over packet-switched networks, such as Internet Protocol television (IPTV), Internet access, and voice-over-Internet-Protocol (VoIP) telephony services, and more particularly to methods and systems for monitoring such services.

BACKGROUND

Various services, including Internet access, voice-over-Internet-Protocol (VoIP) telephony, and Internet Protocol television (IPTV), are now being provided over packet-switched networks.

Subscribers to such services enjoy certain advantages, such as interactive features and/or other additional functionality, which they may not find in corresponding services provided over traditional networks (e.g., the public switched telephone network (PSTN), cable television, etc.). However, these services are also susceptible to various issues which can create service impairments affecting a subscriber's quality of experience (QoE). For example, a subscriber to an IPTV service may experience pixelation, screen freezing, set-top box crashes, outages, or other impairments, a subscriber to a VoIP telephony service may experience poor voice quality, dropped calls, or other impairments, etc.

While certain techniques have been used by service providers in an attempt to mitigate such service impairments, there remains a need for solutions directed to monitoring these services, including monitoring a subscriber's quality of experience and/or a network's performance in respect of such services.

SUMMARY OF THE INVENTION

According to an aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of upstream packets intended for an access network having been discarded by the gateway without having been sent to the access network; determining a second parameter indicative of an incidence of gaps between downstream packets received by the media application from the gateway; determining, based on at least the first parameter and the second parameter, a compound parameter indicative of a likelihood that a request for retransmission issued by the media application will not reach the head-end server; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet unless the missing downstream packet falls within a gap that exceeds a threshold size. The method comprises: determining a first parameter indicative of an incidence of downstream packets intended for the media application having been discarded by the gateway without having been sent to the media application; determining a second parameter indicative of an incidence of gaps between downstream packets received by the media application from the gateway; determining, based on at least the first parameter and the second parameter, a compound parameter indicative of a likelihood that a gap detected by the media application will have a size exceeding the threshold size; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet unless the missing downstream packet falls within a gap that exceeds a threshold size. The method comprises: determining a first parameter indicative of an incidence of downstream packets having been detected as corrupted; determining a second parameter indicative of an incidence of gaps between downstream packets received by the media application from the gateway; determining, based on at least the first parameter and the second parameter, a compound parameter indicative of a likelihood that a gap detected by the media application will have a size exceeding the threshold size; and recording a log of the compound parameter on a storage medium.

According to another aspect of the invention, there is provided a method of monitoring performance of a system that comprises a gateway connected to at least one appliance running a plurality of applications including a media application and at least one second application. The media application is configured to detect gaps between downstream packets received from the gateway and to issue to a head-end server a request for re-transmission of a missing downstream packet. The method comprises: determining a first parameter indicative of an incidence of downstream packets having been detected as corrupted; determining a second parameter indicative of an incidence of gaps between downstream packets received by the media application from the gateway; determining, based on at least the first parameter and the second parameter, a compound parameter indicative of a degree to which packets related to the at least one second application are corrupted; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of upstream packets sent from the gateway to an access network having been detected as corrupted; determining a second parameter indicative of an incidence of gaps between downstream packets received by the media application from the gateway; determining, based on at least the first parameter and the second parameter, a compound parameter indicative of a likelihood that a request for retransmission issued by the media application will not reach the head-end server; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of downstream packets having been detected as corrupted; determining a second parameter indicative of an incidence of fixed-duration intervals containing at least one downstream packet detected as corrupted; determining, based on at least the first parameter and the second parameter, a compound parameter indicative of a rate at which requests for retransmission are issued by the media application; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of downstream packets having been detected as corrupted; determining a second parameter indicative of an incidence of severely errored intervals, a severely errored interval being a fixed-duration interval containing more than a threshold number of downstream packets that are detected as corrupted; determining, based on at least the first parameter and the second parameter, a compound parameter indicative of an incidence of downstream packets having been corrupted outside the severely errored intervals; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of upstream packets sent from the gateway to an access network having been detected as corrupted; determining a second parameter indicative of an incidence of fixed-duration intervals containing at least one upstream packet sent from the gateway that is detected as corrupted; determining, based on at least the first parameter and the second parameter, a compound parameter indicative of a time taken to service an interactive command provided by a user of the media application; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of upstream packets sent from the gateway to an access network having been detected as corrupted; determining a second parameter indicative of an incidence of severely errored intervals, a severely errored interval being a fixed-duration interval containing more than a threshold number of upstream packets sent from the gateway that are detected as corrupted; determining, based on at least the first parameter and the second parameter, a compound parameter indicative of an incidence of upstream packets having been corrupted outside the severely errored intervals; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of missing downstream packets having been retransmitted by the head-end server; determining a second parameter indicative of an incidence of missing downstream packets for which a request for retransmission has been issued; determining, based on at least the first parameter and the second parameter, a compound parameter indicative of a success rate of the head-end server in handling requests for retransmission issued by the media application; and recording a log of the compound parameter on a storage medium.

According to another aspect of the invention, there is provided a method of monitoring performance of a system that comprises a gateway connected to an appliance running a media application. The media application is configured to detect gaps between downstream packets received from the gateway and to issue to a head-end server a request for retransmission of a missing downstream packet. The method comprises: determining a first parameter indicative of an incidence of downstream packets not reaching the media application in time for a content of the media packets to be delivered to a user of the media application; determining a second parameter indicative of an incidence of downstream packets having been detected as corrupted; determining a third parameter indicative of an incidence of downstream packets intended for the media application having been discarded by the gateway without having been sent to the media application; determining, based on at least the first, second and third parameters, a compound parameter indicative of a faultiness of a connection between the gateway and the appliance; and recording a log of the compound parameter on a storage medium.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 7 to 11 show examples of manifestations of a graphical user interface (GUI) of a monitoring tool;

FIG. 12 shows an example of how a user of the monitoring tool can identify a root cause of a subscriber's issue.

Figure 1:
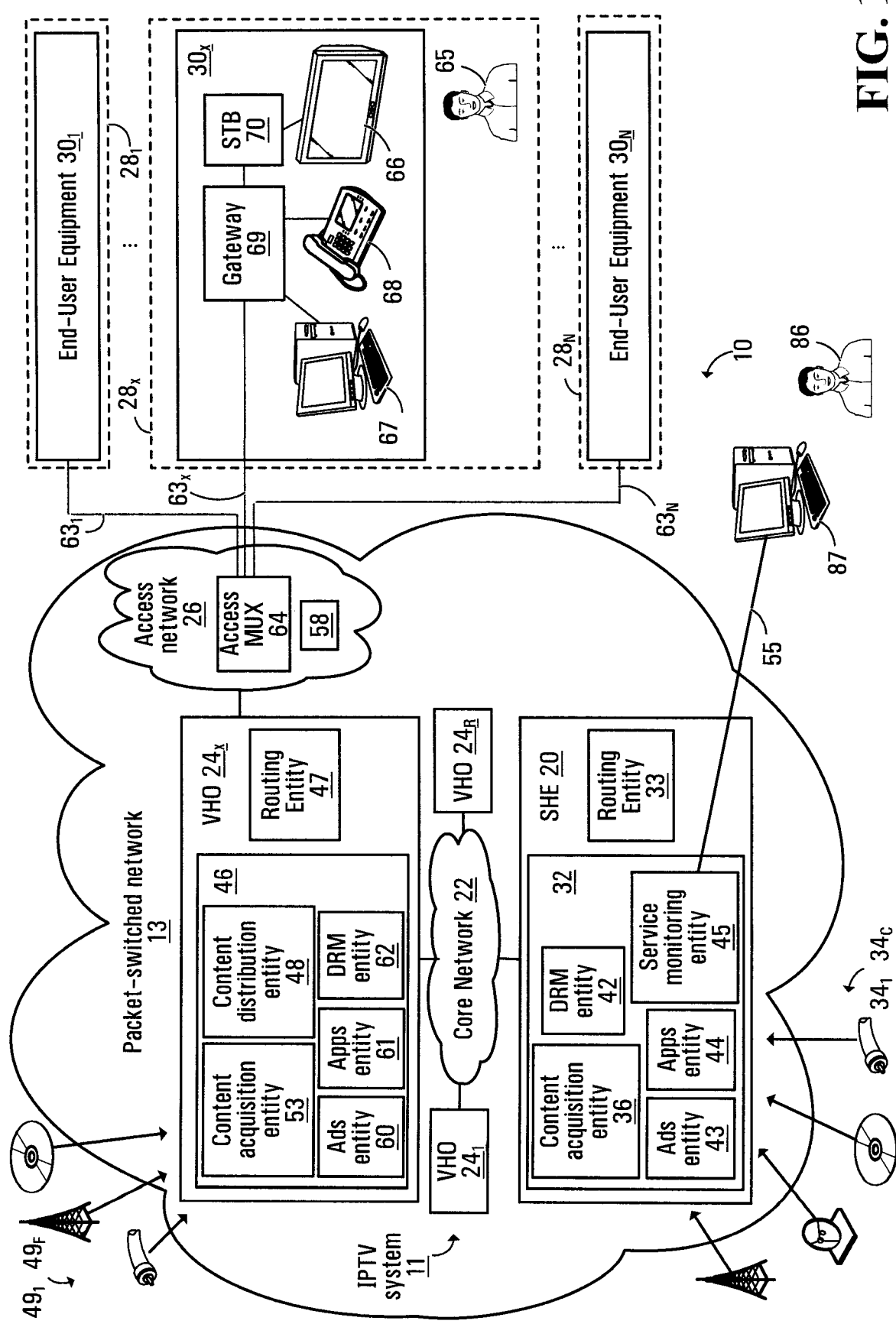
FIG. 1 shows an example of a network for providing services, including an Internet Protocol television (IPTV) service, to subscribers in accordance with an embodiment of the invention.
Figure 3:
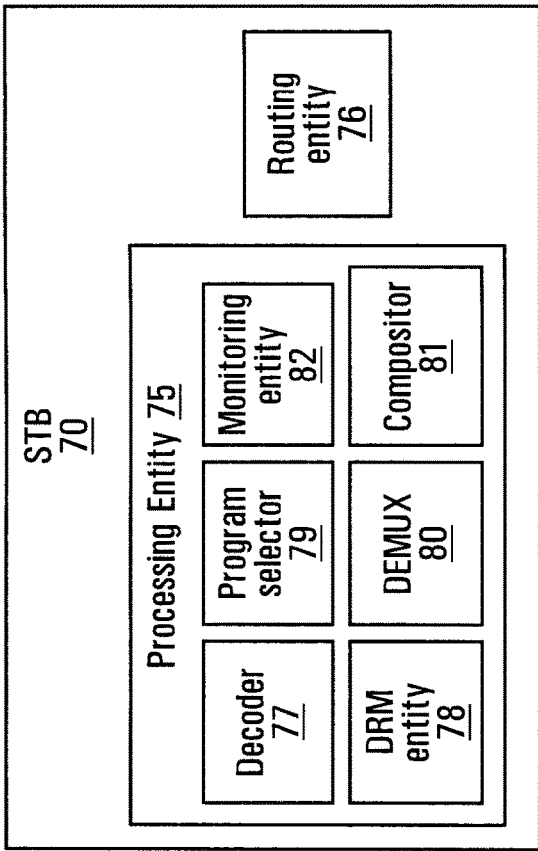
FIG. 3 shows an example of a set-top box of the subscriber's end-user equipment.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

FIG. 1 shows an example of a network 10 for providing services to subscribers in accordance with an embodiment of the invention. In this embodiment, one of these services is a television-containing multimedia service which is provided by a service provider (e.g., a telecommunications company, a cable company, etc.) that controls at least part of a packet-switched network 13 over which this service is delivered to subscribers. This control helps to ensure a desired level of quality of service, security, interactivity and reliability for the subscribers. The service provider thus has a relationship with each subscriber of the television-containing multimedia service in order for that subscriber to have the service it provides. Other services which may be provided over the network 10 may include, for example, an Internet access service and a telephone service.

More particularly, in this embodiment, the television-containing multimedia service is an Internet Protocol television (IPTV) service delivered over the packet-switched network 13 which employs Internet Protocol (IP) routing to convey audio, video and control data. The IPTV service includes delivery of television (TV) content comprising TV programs (e.g., live or recorded drama, comedy, news, reality or other TV shows, movies, sporting events, etc.) currently broadcast on various TV channels. In this case, the IPTV service also provides time-shifted TV programming allowing the subscribers to watch TV programs in a time-shifted manner (e.g., a "catch-up" TV feature which replays a TV program broadcast hours or days ago, or a "start-over" TV feature which replays a current TV program from its beginning). In addition to delivery of currently-broadcast TV content, in this case, the IPTV service also includes delivery of other audio/video (A/V) content on-demand, such as movies, TV shows, etc., which are not part of scheduled TV programming but can be selected by the subscribers using a video-on-demand (VOD) feature.

The network 10 comprises an IPTV system 11 which acquires TV and other A/V content, processes (e.g., encodes and/or stores) the acquired content, and distributes the content to the subscribers via packets conveyed over the packet-switched network 13. In this embodiment, the IPTV system 11 comprises a network apparatus 20 that will be referred to as a "super head-end" (SHE) and that is connected to a core network 22, which is also connected to a plurality of network apparatuses $24_1$-$24_R$ that will be referred to as "video hub offices" or "video head-end offices" (VHOs), each of which is also connected to an access network 26 that is also connected to end-user equipment, including, in this example, end-user equipment $30_1$-$30_N$ located at subscriber premises $28_1$-$28_N$ of the subscribers (sometimes referred to as "customer premises equipment" (CPE)).

The SHE 20 comprises suitable hardware and/or software for implementing a plurality of functional entities, including a processing entity 32 and a routing entity 33.

The processing entity 32 is configured to acquire TV and/or other A/V content and process this content for distribution to the subscribers. More particularly, in this embodiment, the processing entity 32 comprises a content acquisition entity 36 which performs a content ingestion process to acquire TV and other A/V content from a plurality of sources of content $34_1$-$34_C$. For example, a source of content $34_x$ may comprise an antenna receiving radio broadcast content (e.g., TV programs on national broadcast channels), a cable (e.g., fiber-optic or coaxial) conveying broadcast content (e.g., TV programs on specialty channels), a satellite dish receiving content conveyed by a satellite signal, storage media (e.g., magnetic or optical disks) storing recorded content (e.g., movies or TV shows), or any other source of content (e.g., a wired or wireless link conveying content taken from a live studio). The content acquisition entity 36 may comprise one or more encoders (e.g., for MPEG or WM compression) and one or more servers to acquire the content and put it in a format for distribution to the subscribers. For instance, in this embodiment, IPTV system 11 is implemented using a Microsoft IPTV™ platform and the content acquisition entity 36 comprises one or more acquisition servers, referred to as "A-servers". In other embodiments, the IPTV system 11 may be implemented using any other suitable platform.

The processing entity 32 may perform other operations in addition to its content acquisition operation. For example, in this embodiment, the processing entity 32 comprises a digital rights management (DRM) entity 42 for encrypting or otherwise processing the acquired content to prevent unauthorized access, copying or conversion to other formats by end-users. As another example, in this embodiment, the processing entity 32 comprises an advertisement entity 43 for inserting advertisements in some of the content distributed to the subscribers. As yet another example, in this embodiment, the processing entity 32 comprises an applications entity 44 for implementing applications that may be invoked by the subscribers (e.g., an electronic program guide (EPG) displaying scheduling information for current and upcoming programming, games or other interactive features, etc.)

Furthermore, in accordance with an embodiment of the invention, and as further discussed later, the processing entity 32 comprises a service monitoring entity 45 configured to collect and analyze data regarding parameters related to the IPTV service provided to the subscribers in order to assess various aspects of the IPTV service, including a quality of experience (QoE) of the subscribers.

In some embodiments, the processing entity 32, including the content acquisition entity 36, the DRM entity 42, the advertisement entity 43, the applications entity 44 and the service monitoring entity 45, may be part of a content management system (CMS) used by the service provider. In other embodiments, one or more components of the processing entity 42 may be part of one or more other systems used by the service provider. For instance, in some cases, the service monitoring entity 45 may be part of a network management system (e.g., Operations Support Systems/Business Support Systems (OSS/BSS)) used by the service provider.

The routing entity 33 is configured to transmit and receive packets pertaining to the IPTV service over the core network 22. For instance, the routing entity 33 may comprise one or more routers or switches. Packets transmitted by the routing entity 33 in a downstream direction (i.e., towards the end-user equipment $30_1$-$30_N$) may include packets conveying TV and/or other A/V content for distribution to the subscribers. For example, packets conveying TV content currently being broadcast may be transmitted as multicast streams, while packets conveying content selected on-demand may be transmitted as unicast streams. Packets received by the routing entity 33 in an upstream direction (i.e., towards the SHE 20) may include packets conveying requests or commands made by the subscribers via the end-user equipment $30_1$-$30_N$ (e.g., TV channel changes, movie selections from the VOD feature, etc). Packets received by the routing entity 33 in the upstream direction may also include packets which convey data regarding parameters related to the IPTV service provided to the subscribers and which are destined for the service monitoring entity 45.

The SHE 20 may serve a relatively large geographical area. For instance, in some embodiments, the SHE 20 may serve at a national level, in which case the broadcast content from the sources of content $34_1$-$34_C$ may include broadcast content on national TV channels and/or the advertisements inserted by the advertisement entity 43 may be national ads.

The core network 22 comprises high-capacity communication links (e.g., optical fiber links, etc.) which interconnect different components of the network 10, including in this case the SHE 20 and the VHOs $24_1$-$24_R$.

The VHOs $24_1$-$24_R$ are geographically distributed in order to deliver the IPTV service to subsets of the subscribers in different regions. In that sense, the VHOs $24_1$-$24_R$ can viewed as "regional head-ends" acting as relay points between the SHE 20 and the subscribers. For instance, in some embodiments, each of the VHOs $24_1$-$24_R$ may be used to deliver the IPTV service to between 100,000 and 1,000,000 subscribers.

Each VHO $24_x$ comprises suitable hardware and/or software for implementing a plurality of functional entities, including a processing entity 46 and a routing entity 47.

The processing entity 46 of the VHO $24_x$ is configured to distribute TV and/or other A/V content to the subscribers. More particularly, in this embodiment, the processing entity 46 comprises a content distribution entity 48 for delivering content to respective ones of the subscribers over the access network 26. Some content distributed by the content distribution entity 48 is received from the SHE 20 over the core network 22. In addition, in this embodiment, some content distributed by the content distribution entity 48 may be acquired at the VHO $24_x$ from a plurality of sources of content $49_1$-$49_F$ such that the VHO $24_x$ comprises a content acquisition entity 53. For example, a source of content $49_x$ may comprise an antenna receiving regional radio broadcast content (e.g., TV programs on regional TV channels), a cable conveying regional broadcast content (e.g., TV programs on specialty channels targeted to the regional audience), storage media storing recorded content (e.g., movies or TV shows targeted to the regional audience), or any other source of content. The content acquisition entity 53 may comprise one or more encoders and one or more servers to acquire the content and put it in a format for distribution to the subscribers. For instance, in this embodiment where the IPTV system 11 is implemented using a Microsoft IPTV™ platform, the content acquisition entity 53 comprises one or more "A-servers".

The content distribution entity 48 comprises one or more distribution servers to distribute the content to the subscribers. More particularly, in this embodiment, the content distribution entity 48 comprises one or more distribution servers configured to distribute TV content received from the SHE 20 and/or acquired by the VHO $24_x$ to the subscribers. For instance, in this embodiment where the IPTV system 11 is implemented using a Microsoft IPTV™ platform, each of these one or more distribution servers is a "D-server". Also, in this embodiment, the content distribution entity 48 comprises one or more on-demand servers configured to distribute on-demand content selected by the subscribers (e.g., VOD servers for delivering movies, TV shows or other content on-demand).

The processing entity 46 of the VHO $24_x$ may perform other operations in addition to its content distribution operation. For example, in this embodiment, the processing entity 46 comprises a DRM entity 62 for encrypting or otherwise processing the content acquired at the VHO $24_x$ to prevent unauthorized access, copying or conversion to other formats by end-users. As another example, in this embodiment, the processing entity 46 comprises an advertisement entity 60 for inserting advertisements in some of the content distributed to the subscribers. As yet another example, in this embodiment, the processing entity 46 comprises an applications entity 61 for implementing applications that may be invoked by the subscribers (e.g., an electronic program guide (EPG) displaying scheduling information for current and upcoming programming, games and/or other interactive features, etc).

The routing entity 47 of the VHO $24_x$ is configured to route packets pertaining to the IPTV service over the access network $26_x$. For instance, the routing entity 33 may comprise one or more routers or switches. Packets transmitted by the routing entity 47 in the downstream direction may include packets conveying TV and/or other A/V content for distribution to the subscribers. Packets transmitted by the routing entity 47 in the upstream direction may include packets conveying requests or commands made by the subscribers (e.g., TV channel changes, movie selections from the VOD feature, etc.). Packets transmitted by the routing entity 47 in the upstream direction may also include packets conveying requests for retransmission of certain packets conveying TV and/or other A/V content that were missing, discarded, corrupted or otherwise not properly received by pieces of equipment of the end-user equipment $30_1$-$30_N$ at the subscriber premises $28_1$-$28_N$. Packets transmitted by the routing entity 47 in the upstream direction may also include packets which convey data regarding parameters related to the IPTV service provided to the subscribers and which are destined for the service monitoring entity 45 of the SHE 20.

As mentioned above, the VHO $24_x$ may be used for delivering the IPTV service to subscribers in a particular region. For instance, in this embodiment, while the SHE 20 is used at a national level, the VHO $24_x$ is used at a regional level such that the broadcast content from the sources of content $49_1$-$49_F$ may include broadcast content on regional TV channels and/or the advertisements inserted by the advertisement entity 60 may be regional ads.

The access network 26 (sometimes referred to as the "last mile") forms a final leg delivering connectivity to subscribers and comprises a plurality of communication links that connect end-user equipment of subscribers to a remainder of the network 10, including, in this example, a plurality of communication links $63_1$-$63_N$ that reach the end-user equipment $30_1$-$30_N$ located at the subscriber premises $28_1$-$28_N$. In this embodiment, the communication links $63_1$-$63_N$ are connected to an access network apparatus 64. In this example, the access network apparatus 64 is an access multiplexer. More particularly, in this embodiment, each of the communication links $63_1$-$63_N$ comprises a metallic twisted-pair cable (e.g., a copper twisted-pair cable) and the access multiplexer 64 is a digital subscriber line access multiplexer (DSLAM). For instance, in some embodiments, the access network 26 may implement a fiber-to-the-node or -neighborhood (FTTN) architecture such that the DSLAM 64 comprises a FUN platform (e.g., an Alcatel 7330 Intelligent Services Access Manager (ISAM) Fiber to the Node (FTTN) platform).

The access network 26 also comprises a monitoring entity 58 configured to perform measurements of certain parameters related to the IPTV service provided to the subscribers and to report data regarding these parameters to the service monitoring entity 45, as further discussed later. In some embodiments, the DSLAM 64 and the monitoring entity 58 may be implemented by a common network component. In other embodiments, the DSLAM 64 and the monitoring entity 58 may be implemented by distinct network components linked together by one or more physical links.

The access network 26 may be implemented in various other ways in other embodiments. For example, in some embodiments, the access network 26 may be based on another type of fiber-to-the-x (FTTx) architecture, such as a fiber-to-the-curb (FTTC) architecture, or a fiber-to-the-premises (FTTP) architecture (e.g., fiber-to-the-building (FTTB) or fiber-to-the-house (FTTH) infrastructures) in which case the access multiplexer 64 may be omitted and the communication links $63_1$-$63_N$ may comprise optical fiber cables leading to optical network terminals (ONTs) that may be part of the end-user equipment $30_1$-$30_N$ at the subscriber premises $28_1$-$28_N$. As another example, in some embodiments, each of the communication links $63_1$-$63_N$ may comprise a coaxial cable instead of a metallic twisted-pair cable or optical fiber cable.

Various network apparatuses of the network 10, including those of the IPTV system 11 (e.g., the SHE 20 and the VHOs $24_1$-$24_R$), thus implement a head-end system for communicating with the end-user equipment $30_1$-$30_N$ at the subscriber premises $28_1$-$28_N$ to provide the IPTV service and possibly one or more other services (e.g., an Internet access service, a telephone service, etc.). Various servers of the network 10 which communicate with the end-user equipment $30_1$-$30_N$ at the subscriber premises $28_1$-$28$ (e.g., a D-server of the content distribution entity 48) may thus be referred to as "head-end servers".

While the network 10 has a certain configuration in this embodiment, the network 10 may have various other configurations in other embodiments. For example, in some embodiments, one or more additional network apparatuses, such as a Video Serving Office (VSO), may be provided between the VHO $24_x$ and the access network 26.

The end-user equipment $30_1$-$30_N$ located at the subscriber premises $28_1$-$28_N$ enable the subscribers at these premises to have the IPTV service and possibly one or more other services (e.g., an Internet access service, a telephone service, etc.).

The end-user equipment $30_x$ located at the subscriber premises $28_x$ is configured to receive and transmit packets pertaining to the IPTV service over the access network $26_x$ to allow a user 65 at the subscriber premises $28_x$ to be presented with TV content and/or other A/V content on a TV set 66. The TV set 66 may be based on any suitable display technology, including cathode ray tube (CRT), a liquid-crystal display (LCD), plasma, or any other type of TV display technology (e.g., Digital Light Processing (DLP) or organic light emitting diode (OLED)). In this embodiment, the end-user equipment $30_x$ can also receive and transmit packets pertaining to an Internet access service over the access network $26_x$ to allow the user 65 to browse the Internet on a personal computer 67 (e.g., a desktop computer, a laptop computer, etc.), as well as packets pertaining to a voice-over-IP (VoIP) telephony service over the access network 26 to allow the user 65 to engage in telephone calls using a telephone 68 (e.g., a VoIP phone, a a Plain Old Telephony System (POTS) phone equipped with an analog terminal adapter (ATA), or a softphone).

More particularly, in this embodiment, the end-user equipment $30_x$ comprises a gateway 69 connected to a set-top box (STB) 70 which is connected to the TV set 66. The STB 70 is an example of an appliance running a media application, namely an IPTV application. In this embodiment, the gateway 69 is also connected to the personal computer 67 and the telephone 68. The personal computer 67 is another example of an appliance running a media application, namely an Internet browser application. The telephone 68 is yet another example of an appliance running a media application, namely a telephony application.

Figure 2:
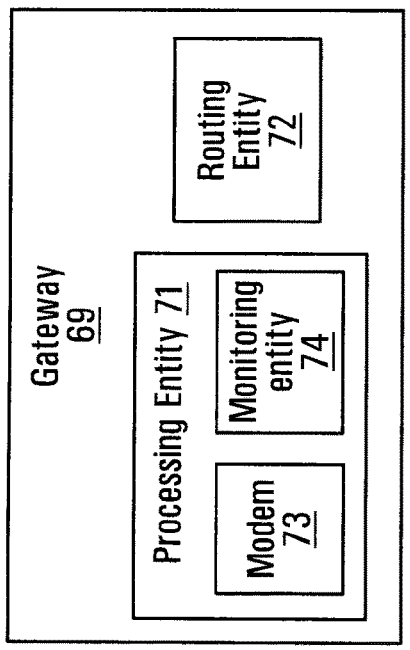
FIG. 2 shows an example of a gateway of a subscriber's end-user equipment.

With additional reference to FIG. 2, the gateway 69 comprises suitable hardware and/or software for implementing a plurality of functional entities, including a processing entity 71 and a routing entity 72. The processing entity 71 comprises a modem 73 for modulating analog carrier signals to encode digital information and to demodulate analog carrier signals to decode information they convey. For example, in this embodiment where the communication links $63_x$ comprises a metallic twisted-pair cable, the modem 73 is a DSL modem. The modem 73 may be of another type in other embodiments (e.g., a cable modem) depending on the nature of the communication link $63_x$.

The processing entity 71 of the gateway 69 also comprises a monitoring entity 74 configured to perform measurements of certain parameters related to the IPTV service provided to the subscriber at the subscriber premises $28_x$ and to report data regarding these parameters to the service monitoring entity 45, as further discussed later.

The routing entity 72 of the gateway 69 is configured to route packets pertaining to the IPTV service to and from the STB 70 over a physical communication link (i.e., a wired link or wireless link). For instance, the routing entity 72 may comprise a router, switch or other data forwarding component. Packets transmitted by the routing entity 72 to the STB 70 may include packets conveying TV and/or other A/V content for presentation on the TV set 66. Packets transmitted by the routing entity 72 over the access network 26 may include packets conveying requests or commands made by the user 65 (e.g., TV channel changes, selections of movies from the VOD feature, etc.). Packets transmitted by the routing entity 72 over the access network 26 may also include packets conveying requests for retransmission of certain packets conveying TV and/or other A/V content that were missing, discarded, corrupted or otherwise not properly received by the STB 70. Packets transmitted by the routing entity 72 over the access network may also include packets which convey data regarding parameters related to the IPTV service provided to the subscriber at the subscriber premises 28, and which are destined for the service monitoring entity 45.

In this embodiment, the routing entity 72 of the gateway 69 is also configured to route data pertaining to the Internet access service to and from the personal computer 67, as well to route signals pertaining to the telephone service to and from the telephone 68 (e.g., via a suitable connector depending on whether the phone 68 is a wired POTS equipped with an ATA, a VoIP phone, etc.)

Thus, in this embodiment, the gateway 69 acts as a center or hub for end-user devices at the subscriber premises $28_x$. More particularly, in this embodiment the subscriber premises $28_x$ is a residence and the gateway 69 is a residential gateway (RG) whose functional entities, including the processing entity 71 and the routing entity 72, are integrated into a terminal installed at a suitable location at the residence. In other embodiments, the functional entities of the gateway 69 may be part of two or more distinct devices interconnected to one another via one or more physical links.

The STB 70 comprises suitable hardware and/or software for implementing a plurality of functional entities, including a processing entity 75 and a routing entity 76. The processing entity 75 is configured to process a stream of packets conveying TV and/or other A/V content and received via the routing entity 76 in order to generate A/V signals transmitted to the TV set 66 for presenting the TV and/or other A/V content to the user 65. More particularly, in this embodiment, the processing entity 75 comprises a decoder 77 for decoding packets in the received stream of packets. Also, in this embodiment, the processing entity 75 comprises a DRM entity 78 to decrypt or otherwise process the received packets to undue the effects of the DRM entity 42 of the SHE 20 and/or the DRM entity 62 of the VHO $24_x$. A program selector 79 extracts a selected program stream corresponding to a selection made by the user 65 and provides the packets of the selected program stream to a demultiplexer 80, which divides them into elementary streams (voice, audio and control) that are supplied to a compositor 81 creating A/V signals transmitted to the TV set 66.

The processing entity 75 of the STB 70 is also configured to detect defects, such as corrupted packets, in the received stream of packets. When possible, the processing entity 75 may correct some of the detected defects in the received stream of packets. For example, in this embodiment, these detection and correction functions may be implemented by the decoder 77 of the processing entity 75.

The processing entity 75 of the STB 70 also comprises a monitoring entity 82 configured to perform measurements of certain parameters related to the IPTV service provided to the subscriber at the subscriber premises $28_x$ and to report data regarding these parameters to the service monitoring entity 45, as further discussed later.

The routing entity 76 of the STB 70 is configured to route packets pertaining to the IPTV service to and from the gateway 69 over the physical communication link linking these components. For instance, the routing entity 76 may comprise a receiver and a transmitter. Packets received by the routing entity 76 in the downstream direction may include packets conveying TV and/or other A/V content for presentation on the TV set 66. Packets transmitted by the routing entity 76 in the upstream direction may include packets conveying requests or commands made by the user 65 (e.g., TV channel changes, movie selections from the VOD feature, etc.). Packets transmitted by the routing entity 76 in the upstream direction may also include packets conveying requests for retransmission of certain packets conveying TV and/or other A/V content that were missing, discarded, corrupted or otherwise not properly received by the STB 70. Packets transmitted by the routing entity 76 in the upstream direction may also include packets which convey data regarding parameters related to the IPTV service provided to the subscriber at the subscriber premises $28_x$ and which are destined for the service monitoring entity 45.

Although in this embodiment the STB 70 is connected to the TV set 66, in other embodiments, functional entities corresponding to the processing entity 75 and the routing entity 76 of the STB 70 may be integrated into the TV set 66.

As mentioned previously, in this embodiment, the service monitoring entity 45 is configured to collect and analyze data regarding parameters related to the IPTV service provided to the subscribers in order to assess various aspects of the IPTV service, including the QoE of the subscribers.

Figure 4:
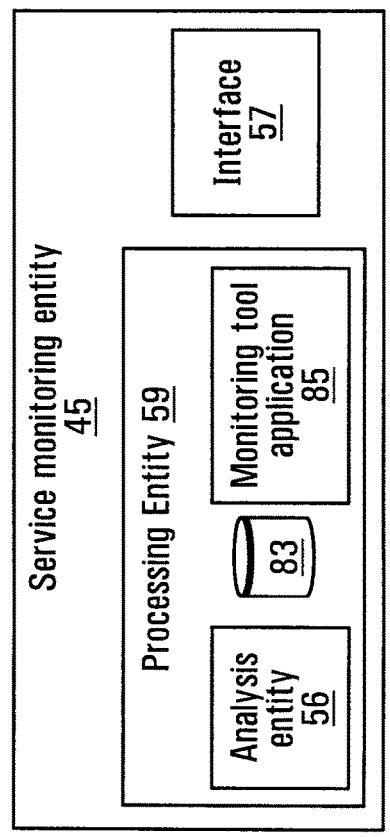
FIG. 4 shows an example of a service monitoring entity of the network.

Referring additionally to FIG. 4, the service monitoring entity 45 comprises an interface 57 and a processing entity 59. The interface 57 of the service monitoring entity 45 allows data, including data regarding parameters related to the IPTV service provided to the subscribers, to be received and transmitted by the service monitoring entity 45. The processing entity 59 is configured to process data received or to be transmitted via the interface 57. More particularly, in this embodiment, the processing entity 59 comprises an analysis entity 56 for analyzing the data to derive information indicative of the QoE of the subscribers, as well as a database 83 for storing the data and the derived information indicative of the QoE of the subscribers, as further discussed below.

The parameters related to the IPTV service provided to the subscribers, which will be referred to as "IPTV service parameters", can take on various forms. For instance, Table 1 presents examples of IPTV service parameters that may be considered in this embodiment. Various other examples of IPTV service parameters may be considered in other embodiments.

In Table 1, each line corresponds to a respective IPTV service parameter related to the IPTV service provided to the subscriber at the subscriber premises $28_x$. The first column indicates a name of the respective IPTV service parameter. The second column indicates one or more sources from which the value of the respective IPTV service parameter is determined. Generally, the value of the respective IPTV service parameter may be determined on a basis of measurements performed by the monitoring entity 82 of the STB 70, the monitoring entity 74 of the residential gateway 69, the monitoring entity 58 of the access network 26, and/or other components (e.g., a D-server of the content distribution entity 48 of the VHO $24_x$). In some embodiments, the value of the respective IPTV service parameter may be obtained from a network management system (e.g., an OSS/BSS) used by the service provider and collecting data regarding such measurements. For instance, in this embodiment, the value of the respective IPTV service parameter may be obtained from: a Component Management System (CMS) which collects data regarding measurements performed by components at the subscriber premises $28_x$, namely the residential gateway 69 and the STB 70 (e.g., a "Snapshot" application on the STB 70); an access network system, in this case an Access Care™ (AC) system by Nortel, which collects data regarding measurements performed by the access network 26 and possibly the end-user equipment $30_x$ at the subscriber premises $28_x$ (e.g., the modem 73 ("far end"—FE) may report on packets received, errors, etc., through a communication channel to the DSLAM 64 for record keeping and the DSLAM 64 may perform data reporting and recording for its side ("near end"—NE), and the Access Care system may collect the data from the DSLAM 64 related to the NE and FE and provide it to the service monitoring entity 45); and/or a D-server of the content distribution entity 48 of the VHO $24_x$. In other embodiments, the value of the respective IPTV service parameter may be obtained based on data polled directly from one or more components, such as the residential gateway 69, the STB 70, etc. The second column may also indicate a frequency at which the value of the respective IPTV service parameter is obtained. For instance, in this case, the value of the respective IPTV service parameter may be obtained every fifteen minutes (i.e., the value is for a period of fifteen minutes) or daily (i.e., the value is for a period of one day). The third column provides a definition of the respective IPTV service parameter. The fourth column provides a technical description of the respective IPTV service parameter. The fourth column indicates an importance of the IPTV service parameter for the IPTV service or insight that the IPTV service parameter can give about the IPTV service.

For example, the IPTV service parameter "DISCARD_PKTS_SENT" refers to the number of packets intended to be sent by the residential gateway 69 to the STB 70 but that have been discarded by the residential gateway 69 instead of being sent to the STB 70. The discarded packets may be packets which have been delayed long enough to be useless. This may be caused, for instance, by shortage of resources or buffer overflow at the residential gateway 69. In this embodiment, the value of the "DISCARD_PKTS_SENT" parameter is obtained every fifteen minutes by the residential gateway 69.

As another example, the discarded packets may result in "gaps", which can also be referred to as "holes, in the stream of packets received at the STB 70 where the discarded packets would normally have been. At least some of these holes may result in the STB 70 issuing requests for retransmission of the discarded packets by a D-server of the content distribution entity 48 of the VOH $24_x$. In this example, this applies to a hole at the STB 70 that is not larger than a threshold size (e.g., an interval of time corresponding to a number of consecutive missing packets which would normally occupy the hole). This size may be determined, for instance, by evaluating a maximal number of consecutive packets that can be retransmitted to the STB 70 in time to be reinserted in the stream of packets by the STB 70 (e.g., based on processing speeds of the STB 70 and the residential gateway 69, transmission characteristics of the communication link $63_x$, and/or any other relevant factor). For example, in this case, a request for retransmission may be issued by the STB 70 when encountering a hole with a size not greater than about 150 ms. For holes greater than 150 ms, the STB 70 does not issue requests for retransmission. When there is a request for retransmission, failure of the D-server to retransmit the discarded packets to the STB 70 in a timely manner may lead to pixilation, screen freeze, etc. In this embodiment, the IPTV service parameter "RETRY_NUMBER", which refers to the number of holes smaller than 150 ms encountered by the STB 70 during a 15-minute interval, is measured by the D-server as the number of retransmission requests every 15 minutes and is used as the number of holes ("HOLES") in other IPTV service parameters. In other embodiments, the number of holes ("HOLES") may be determined from measurements performed by the STB 70 itself. For instance, in some cases, a diagnostic tool implemented by the service monitoring entity 45 may query the STB 70 to obtain the number of holes ("HOLES") as measured by the STB 70.

As yet another example, error conditions may occur in the downstream direction from the access network 26 to the residential gateway 69 that can cause packets to be corrupted. For instance, packets can be determined to be corrupted when they are determined to have failed an error check performed by the residential gateway 69. In this case, the error check is a cyclic redundancy check (CRC). Other error checking techniques may be used in other cases. In this embodiment, the IPTV service parameter "FE_CV" refers to far end code violations, which is a count of CRC anomalies received by the residential gateway 69 during a 15-minute interval. Depending on their severity, code violations can lead to errored seconds or severely errored seconds and result in retransmission of IPTV packets from a D-Server of the content distribution entity 48 of the VOH $24_x$ to the STB 70. A high "FE_CV" parameter may lead to visual artifacts such as pixilation or screen freeze and audio impairments such as clipping.

A similar discussion can be made in respect of other ones of the IPTV service parameters listed in Table 1.

TABLE 1

| Parameter | Source/ Frequency | Definition | Technical Description | IPTV Importance |
|---|---|---|---|---|
| CRASH_COUNT | STB Crash Log 15 min | Number of Crashes This is a count of crash events encountered by the set-top box over a 15-min interval. | | IPTV service outage occurs when the set-top box crashes. |
| DISC_RCVD/HOLES | CMS \| D-Server 15 min | Number of Discarded Packets Received divided by Number of Holes Discarded packets received between the set-top box and the Residential Gateway would indicate congestion or out-of-order packets in the upstream direction. | In the event that holes are encountered at the set top box, requests for retransmission from the set-top box may not reach the D-Server due to packets being discarded in the upstream direction. | A value of infinity means that either all IPTV packets have been successfully received at the set-top box (i.e. no holes). A high Discarded Packet Received-to-Holes ratio would increase the probability of the requests for re-transmission from the set-top box failing to |

TABLE 1-continued

| Parameter | Source/ Frequency | Definition | Technical Description | IPTV Importance |
|---|---|---|---|---|
| | | The "DISC_RCVD" (number of discarded packets received) parameter is an example of a parameter indicative of an incidence of upstream packets intended for the access network 26 having been discarded by the gateway 69 without having been sent to the access network 26. The "HOLES" (number of holes) parameter is an example of a parameter indicative of an incidence of gaps between downstream packets received by the IPTV application running on the STB 70 from the gateway 69. | | reach the D-Server, and result in visual and/or audio impairments for the IPTV customer. The "DISC_RCVD/ HOLES" parameter is an example a compound parameter indicative of a likelihood that a request for retransmission issued by the IPTV application running on the STB 70 will not reach the D-server of the content distribution entity 48. |
| DISC_RCVD/REQ | CMS \| D-Server 15 min | Number of Discarded Packets Received divided by Number of Packets Requested Discarded packets received between the set-top box and the Residential Gateway would indicate congestion or out-of-order packets in the upstream direction. The "DISC_RCVD" (number of discarded packets received) parameter is an example of a parameter indicative of an incidence of upstream packets intended for the access network 26 having been discarded by the gateway 69 without having been sent to the access network | In the event that holes are encountered at the set top box, requests for retransmission from the set-top box may not reach the D-Server due to packets being discarded in the upstream direction. | A value of infinity means that either all IPTV packets have been successfully received at the set-top box (i.e. no holes) or the holes are more than 150 ms (i.e. no request for re-transmission). A high Discarded Packet Received-to-Number of Packets Requested ratio would increase the probability of the requests for re-transmission from the set-top box failing to reach the ()-Server, and result in visual and/or audio impairments for the IPTV customer. The "DISC_RCVD/ REQ" parameter is an example a compound parameter indicative of a likelihood that a request for |

TABLE 1-continued

| Parameter | Source/ Frequency | Definition | Technical Description | IPTV Importance |
|---|---|---|---|---|
| | | 26. The "REQ" (number of packets requested) parameter is an example of a parameter indicative of an incidence of gaps between downstream packets received by the IPTV application running on the STB 70 from the gateway 69. | | retransmission issued by the IPTV application running on the STB 70 will not reach the D-server of the content distribution entity 48. |
| DISC_SENT/HOLES | CMS \| D-Server 15 min | Number of Discarded Packets Sent divided by Number of Holes Discarded packets sent denote that packets to be sent from the residential gateway to the set-top box (i.e. downstream direction) are discarded/ dropped before being sent. The "DISC_SENT" (number of discarded packets sent) parameter is an example of a parameter indicative of an incidence of downstream packets intended for the IPTV application running on the STB 70 having been discarded by the gateway 69 without having been sent to the IPTV application running on the STB 70. The "HOLES" (number of holes) parameter is an example of a parameter indicative of an incidence of gaps between downstream packets received by the IPTV application running on the STB 70 from the gateway 69. | This may be caused by shortage of resources or buffer overflow, etc. at the residential gateway. IPTV packets being discarded would result in holes at the set-top box. | A ratio of 1 would strongly suggest that the hole(s) encountered at the set-top box are likely caused by the packets being discarded before being sent at the residential gateway. A ratio of less than 1 is possible (e.g. more than one set-top box in the home watching the same IPTV channel). A ratio of greater than 1 is possible (e.g. a large hole resulting from several packets being discarded by the residential gateway). The "DISC_SENT/ HOLES" parameter is an example of a compound parameter indicative of a likelihood that a gap detected by the IPTV application running on the STB 70 will have a size exceeding a threshold size. |
| DISC_SENT/REQ | CMS \| D-Server 15 min | Number of Discarded Packets Sent | This may be caused shortage of | A ratio of 1:1 by would strongly suggest that the |

TABLE 1-continued

| Parameter | Source/<br>Frequency | Definition | Technical<br>Description | IPTV<br>Importance |
|---|---|---|---|---|
| | | divided by Number of Packets Requested Discarded packets sent denote that packets to be sent from the residential gateway to the set-top box (i.e. downstream direction) are discarded/ dropped before being sent. The "DISC_SENT" (number of discarded packets sent) parameter is an example of a parameter indicative of an incidence of downstream packets intended for the IPTV application running on the STB 70 having been discarded by the gateway 69 without having been sent to the IPTV application running on the STB 70. The "REQ" (number of packets requested) parameter is an example of a parameter indicative of an incidence of gaps between downstream packets received by the IPTV application running on the STB 70 from the gateway 69. | resources or buffer overflow, etc. at the residential gateway. IPTV packets being discarded would result in holes at the set-top box, and result in requests for re-transmission of discarded packets (provided that the discarded packets has a hole size of less than 150 ms). | hole(s) encountered at the set-top box are likely caused by the packets being discarded before being sent at the residential gateway. A high ratio of Discarded Packet Sent-to-Number of Packets Requested may be an indication that the holes caused by the sent packets being discarded are larger than 150 ms (i.e. too large/no request for retransmission). The "DISC_SENT/ REQ" parameter is an example of a compound parameter indicative of a likelihood that a gap detected by the IPTV application running on the STB 70 will have a size exceeding a threshold size. |
| DISCARD_PKTS_RCVD | CMS<br>15 min | Number of Discarded Packets from the set-top box received by Residential Gateway. Discarded packets are packets which arrive out-of-order or have been delayed long enough to become useless. | This parameter is an indication of congestion within home network, resulting in packets from home devices being discarded by the residential gateway discarded due to unacceptable delay. | Discarded IPTV packets received by the residential gateway may lead to slow or no response during channel change, or using PVR trick modes. |
| DISCARD_PKTS_SENT | CMS<br>15 min | Number of Discarded Packets Sent by Residential Gateway. | Discarded packets sent denote that packets to be sent from the residential | When IPTV packets are discarded by the residential gateway instead |

TABLE 1-continued

| Parameter | Source/Frequency | Definition | Technical Description | IPTV Importance |
|---|---|---|---|---|
| | | Discarded packets are packets which have been delayed long enough to be useless; as such, they are being discarded instead of sent by the residential gateway. | gateway to the set-top box (i.e. downstream direction) are discarded/ dropped before being sent. This may be caused by shortage of resources or buffer overflow, etc. at the residential gateway. IPTV packets being discarded would result in holes at the set-top box. | of being sent to the set-top box, holes will likely result and requests for re-transmission to the D-Server will be generated by the set-top box. Failure for the D-Server to re-transmit these discarded packets to the set-top box in a timely manner will lead to pixilation, screen freeze, etc. |
| ERRORS_RCVD | CMS Daily | Number of Errors Received by the Residential Gateway. This provides a daily count of transmission errors in the upstream direction (i.e. received by the Residential Gateway). | Possible errors include CRC errors, corrupted frames, etc. received by the residential gateway from the set-top box. These errors are likely caused by issues with the inside wiring. | High error counts in the upstream direction may result in slow channel change time and/or commands to the PVR being slow or unresponsive. |
| ERRORS_SENT | CMS Daily | Number of Errors Sent by the Residential Gateway This provides a daily count of errors in the IPTV packets detected by the residential gateway. | Possible errors include CRC errors, corrupted frames, etc. detected by the residential gateway prior to sending to the set-top box. | IPTV packets containing errors will result in requests for re-transmission from the set-top box to the D-Server. If these packets are not retransmitted and received by the set-top box in time, visual and/or audio impairments will occur. |
| FE_CB | AccessCare 15 min | Far End-Corrected Block This is a measure of the number of packets with errors which have been corrected in the downstream direction. | This is a count of the number of blocks at the residential gateway (i.e. downstream) which have been corrected using FEC (forward error correction) during the 15-min interval. | Corrected Blocks should not have any direct impact on IPTV customer experience. |
| FE_CV | AccessCare 15 min | Far End-Code Violation This is a measure of errors conditions of the DSL connection in the downstream direction. | Code violation is defined as a count of the CRC anomalies occurring during the accumulation period (15-min). Far End Code Violation refers to CRC anomalies received by the Residential Gateway. | Depending on the severity, the presence of code violations leads to errored seconds or severely errored seconds. Code violations in the downstream direction results in retransmission of IPTV packets from the D-Server to the set-top box. A high |

TABLE 1-continued

| Parameter | Source/ Frequency | Definition | Technical Description | IPTV Importance |
|---|---|---|---|---|
| | | | | CV value in the downstream may lead to visual artefacts such as pixilation or screen freeze and audio impairments such as clipping. |
| FE_CV/FE_ES | AccessCare 15 min | Far End Code Violations divided by Far End Errored Seconds The "FE_CV" (far end code violations) parameter is an example of a parameter indicative of an incidence of downstream packets having been detected by the gateway 69 as corrupted. The "FE_ES" (far end errored seconds) parameter is an example of a parameter indicative of an incidence of fixed-duration intervals (e.g., 1-second intervals) containing at least one downstream packet detected by the gateway 69 as corrupted. | This ratio is an indicator of how the Code Violations in the downstream direction are distributed during the 15-min interval. | A high CV-to-ES ratio in the downstream direction will likely result in frequent packet retransmissions between the D-Server and set-top box, with a high probability of visual and/or audio impairments being observed by the IPTV customer. The "FE_CV/ FE_ES" parameter is an example of a compound parameter indicative of a rate at which requests for retransmission are issued by the IPTV application running on the STB 70. |
| FE_CV/FE_SESM | AccessCare 15 min | Far End Code Violations divided by Far End Severely Errored Seconds The "FE_CV" (far end code violations) parameter is an example of a parameter indicative of an incidence of downstream packets having been detected by the gateway 69 as corrupted. The "FE_SESM" (far end severely errored seconds) parameter is an example of a parameter indicative of an incidence of severely errored intervals, where a severely errored interval is a fixed-duration interval (e.g., a 1-second interval) containing more | This ratio is an indicator of how the Code Violations in the downstream direction are distributed while the DSL connection is reporting severely errored seconds during the 15-min interval. | A high CV-to-SES ratio in the downstream direction suggests that CVs are also likely occurring outside of the intervals when the DSL connection is experiencing SES condition, and there is a high probability that IPTV customer will experience visual and audio impairments during the 15-min interval. The "FE_CV/ FE_SESM" parameter is an example of a compound parameter indicative of an incidence of downstream packets having been corrupted outside the |

TABLE 1-continued

| Parameter | Source/ Frequency | Definition | Technical Description | IPTV Importance |
| --- | --- | --- | --- | --- |
| | | than a threshold number of downstream packets that are detected by the gateway 69 as corrupted. | | severely errored intervals. |
| FE_CV/HOLES | D-Server / AC 15 min | Far End Code Violations divided by Number of Holes The "FE_CV" (far end code violations) parameter is an example of a parameter indicative of an incidence of downstream packets having been detected by the gateway 69 as corrupted. The "HOLES" (number of holes) parameter is an example of a parameter indicative of an incidence of gaps between downstream packets received by the IPTV application running on the STB 70 from the gateway 69. | Code Violations in the downstream direction may lead to packet loss (i.e. holes) at the set-top box during the 15-min interval. | A high CV-to-Holes in the downstream direction suggests that a higher probability of holes greater than 150 ms, which are not being requested for retransmission. This will result in visual and audio impairments. The "FE_CV HOLES" parameter is an example of a compound parameter indicative of a likelihood that a gap detected by the IPTV application running on the STB 70 will have a size exceeding a threshold size. |
| FE_CV_PKTS_REQ | D-Server / AC 15 min | Far End Code Violations divided by Number of Packets Requested Code Violations in the downstream direction may lead to packet loss at the set-top box. The "FE_CV" (far end code violations) parameter is an example of a parameter indicative of an incidence of downstream packets having been detected by the gateway 69 as corrupted. The "PKTS_REQ" (number of packets requested) parameter is an example of a parameter indicative of an incidence of gaps between downstream packets received | The CV-to-Packet Requested ratio in the downstream direction is an indication of the impact of code violations on IPTV packets (vs. Internet packets) during the 15-min interval. | A high CV-to-Packet Requested ratio in the downstream direction would suggest that non-IPTV packets may also be impacted. The "FE_CV/ PKTS_REQ" parameter is an example of a compound parameter indicative of a degree to which packets related to at least one other application running in the end-user equipment $30_x$ (e.g., the Internet browser application running on the computer 67) are corrupted. |

TABLE 1-continued

| Parameter | Source/ Frequency | Definition | Technical Description | IPTV Importance |
|---|---|---|---|---|
| | | by the IPTV application running on the STB 70 from the gateway 69. | | |
| FE_CV_SUB_HOLES | D-Server | AC 15 min | Far End Code Violations minus Number of Holes The "FE_CV" (far end code violations) parameter is an example of a parameter indicative of an incidence of downstream packets having been detected by the gateway 69 as corrupted. The "HOLES" (number of holes) parameter is an example of a parameter indicative of an incidence of gaps between downstream packets received by the IPTV application running on the STB 70 from the gateway 69. | Code Violations in the downstream direction may lead to packet loss (i.e. holes) at the set-top box during the 15-min interval. | A high value suggests that a higher probability of holes greater than 150 ms, which are not being requested for retransmission. This will result in visual and audio impairments. The "FE_CV_SUB_HOLES" parameter is an example of a compound parameter indicative of a likelihood that a gap detected by the IPTV application running on the STB 70 will have a size exceeding a threshold size. |
| FE_CV_SUB_PKTS_REQ | D-Server | AC 15 min | Far End Code Violations minus Packets Requested The "FE_CV" (far end code violations) parameter is an example of a parameter indicative of an incidence of downstream packets having been detected by the gateway 69 as corrupted. The "PKTS_REQ" (packets requested) parameter is an example of a parameter indicative of an incidence of gaps between downstream packets received by the IPTV application running on the STB 70 from the gateway 69. | Code Violations in the downstream direction may lead to packet loss (i.e. holes) at the set-top box during the 15-min interval. | A high value suggests that a higher probability of holes greater than 150 ms, which are not being requested for retransmission. This will result in visual and audio impairments. The "FE_CV_SUB_PKTS_REQ" parameter is an example of a compound parameter indicative of a likelihood that a gap detected by the IPTV application running on the STB 70 will have a size exceeding a threshold size. |
| FE_ES | AccessCare 15 min | Far End-Errored Seconds This is a measure of errors in the DSL line for the downstream | Far End Errored Seconds refers to the count of 1-second intervals during which: one or more CRC anomalies, or | The presence of error seconds is an indication of problems with the DSL connection which may impact the |

TABLE 1-continued

| Parameter | Source/ Frequency | Definition | Technical Description | IPTV Importance |
|---|---|---|---|---|
| | | direction (i.e. from DSLAM to residential gateway), and will affect both IPTV and Internet packets being transmitted at the time of error condition. | defects such as severely errored frame (SEF), loss of signal (LOS), loss of power (LPR) are detected at the Residential Gateway (i.e. downstream). | transmission, resulting in re-transmission of packets or packet loss. Uncorrected errors in IPTV packets in the downstream direction may lead to video defects such as pixilation, screen freeze, etc. or audio defects such as clipping. |
| FE_HBER | AccessCare 15 min | Far End-High Bit Error Rate This parameter indicates that a high bit error rate is detected by the Residential Gateway (i.e. downstream). | A high bit error rate is an indication of the presence of disturbers such as high noise level in the DSL connection, as detected by the Residential Gateway. | A DSL connection with high bit error rate in the downstream direction will likely have a high count of code violations, errored seconds, etc., which will likely result in visual and audio impairments. |
| FE_SESM | AccessCare 15 min | Far End-Severely Errored Second This measures the number of 1-sec intervals in which the DSL connection has experienced severe error conditions in the downstream direction. | This is a count of 1-second intervals during which there are: 18 or more CRC anomalies, or one or more LOS (loss of signal), SEF (severe errored frame) or LPR (loss of power) defects are detected at the residential gateway (i.e. downstream). | A DSL connection with high count of severely errored seconds in the downstream direction will likely result in visual artefacts such as pixilation or screen freeze and/or audio impairments such as clipping. |
| FE_SFR | AccessCare 15 min | Far End-Superframe Received This is a measure of the amount of traffic being sent from the DSLAM to the residential gateway (i.e. downstream) | This is a count of the number of superframes (or blocks) received by the residential gateway from the DSLAM during the 15-min interval (i.e. downstream) | includes both IPTV and Internet traffic |
| FE_SFT | AccessCare 15 min | Far End-Superframe Transmitted This is a measure of the amount of traffic being sent from the residential gateway to the DSLAM (i.e. upstream) | This is a count of the number of superframes (or blocks) sent from the residential gateway to the DSLAM during the 15-min interval (i.e. upstream). | includes both IPTV and Internet traffic |
| FE_UAS | AccessCare 15 min | Far End-Unavailable Second An unavailable second is a count of 1-second intervals for which the DSL line is | A DSL line becomes unavailable at the onset of 10 contiguous SES (severely errored seconds). This parameter shows the count | A DSL connection with unavailable second(s) in the downstream direction will likely result in loss of video signal (i.e. IPTV |

TABLE 1-continued

| Parameter | Source/Frequency | Definition | Technical Description | IPTV Importance |
|---|---|---|---|---|
| | | unavailable at the DSLAM. | of 1-sec intervals during which the DSL line is unavailable at the Residential Gateway. | service outage) during the 15-min interval. |
| ISW | AccessCare \| CMS \| Snapshot \| 15 min | This is the cont of packets dropped by the inside wiring of a home Calculated as follows: Total_Packets_Expired-FE_CV-disc_sent-disc_rcvd The "Total_Packets_Expired" parameter is an example of a parameter indicative of an incidence of downstream packets not reaching the IPTV application running on the STB 70 in time for a content of the packets to be delivered to the user 65 of the IPTV application running on the STB 70. For instance, in some cases, an example of the "Total_Packets_Expired" parameter may be a number of downstream packets that were expected by the IPTV application running on the STB 70 within a fixed-duration interval and were either not received before expiration of the fixed-duration interval or were received in corrupted form. The "FE_CV parameter is an example of a parameter indicative of an incidence of downstream packets having been detected by the gateway 69 as corrupted. The "disc_sent" parameter is an example of a parameter indicative of an | Packets dropped by the home wiring. During a 15 minute period if there are no packets being reported dropped by the local loop and no packets being dropped by the modem yet the STB report packets being dropped through the D-Server packets requested and packets expired, then the home wiring is causing the issue. This measure can isolate precisely which STB is a problem and point a technician to the right device quickly-therefore reducing the time to resolve the trouble | Reflects in the user experience through pixilation and freezing of the screen The "ISW" parameter is an example of a compound parameter indicative of a faultiness of a connection between the gateway 69 and the STB 70. |

TABLE 1-continued

| Parameter | Source/Frequency | Definition | Technical Description | IPTV Importance |
|---|---|---|---|---|
| | | incidence of downstream packets intended for the IPTV application running on the STB 70 having been discarded by the gateway 69 without having been sent to the IPTV application running on the STB 70. The "disc_rcvd" parameter is an example of a parameter indicative of an incidence of upstream packets intended for the access network 26 having been discarded by the gateway 69 without having been sent to the access network 26. | | |
| Link Resync | CMS Daily | Link Retrain is a re-sync of the DSL connection. | Link retrain can occur when a DSL connection encounters severely errored frame (SEF) defects, high signal-to-noise (SNR) ratio, loss of frames (LOF) or loss of signal (LOS), etc. | Link retrain will likely result in temporary IPTV service outage |
| MAX_HOLE_SIZE | D-Server 15 min | Maximum Hole Size is the the largest hole encountered (measured in ms) by set top box over the 15-min interval | This parameter captures the largest hole (i.e. packet discard or loss), up to 150 ms, encountered during a 15-min interval. | The closer this value is to 150 ms, the higher the probability for holes greater than 150 ms and the more likely visual and/or audio impairments will be experienced by the IPTV customer. |
| NE_CB | AccessCare 15 min | Near End-Corrected Block This is a measure of the number of packets with errors which have been corrected in the upstream direction. | This is a count of the number of blocks at the DSLAM (i.e. upstream) which have been corrected using FEC (forward error correction) during the 15-min interval. | Corrected Blocks should not have any direct impact on IPTV customer experience. |
| NE_CV | AccessCare 15 min | Near End-Code Violation This is a measure of errors conditions of the DSL connection in the upstream direction. | Code violation is defined as a count of the CRC anomalies occurring during the accumulation period (15-min). Near End Code Violation refers to | Depending on the severity, the presence of code violations leads to errored seconds or severely errored seconds. High CVs in the |

TABLE 1-continued

| Parameter | Source/Frequency | Definition | Technical Description | IPTV Importance |
|---|---|---|---|---|
| | | | CRC anomalies received by the DSLAM (i.e. upstream) | upstream direction may lead to slow response in channel change time or some PVR commands. |
| NE_CV/HOLES | D-Server | AC 15 min | Near End Code Violations divided by Number of Holes The "NE_CV" (near end code violations) parameter is an example of a parameter indicative of an incidence of upstream packets sent from the gateway 69 to the access network 26 having been detected by the access network 26 as corrupted. The "HOLES" (number of holes) parameter is an example of a parameter indicative of an incidence of gaps between downstream packets received by the IPTV application running on the STB 70 from the gateway 69. | Code violations in the upstream direction may impact the ability of the set-top box to request retransmission of packets from the D-Server during the 15-min interval. | A value of 0 indicates that requests for all holes less than 150 ms should be received by the D-Server. A high CV-to-Holes ratio indicates a higher probability of requests for retransmission not being received by the D-Server. The "NE_CV/HOLES" parameter is an example of a compound parameter indicative of a likelihood that a request for retransmission issued by the IPTV application running on the STB 70 will not reach the D-server of the content distribution entity 48. |
| NE_CV/NE_ES | AccessCare 15 min | Near End Code Violations divided by Near End Errored Seconds The "NE_CV (near end code violations) parameter is an example of a parameter indicative of an incidence of upstream packets sent from the gateway 69 to the access network 26 having been detected by the access network 26 as corrupted. The "NE_ES (near end errored seconds) parameter is an example of a parameter indicative of an incidence of fixed-duration intervals (e.g., 1-second intervals) containing at least one | This ratio is an indicator of how the Code Violations in the upstream direction are distributed during the 15-min interval. | A high CV-to-ES ratio in the upstream direction will likely result in slow response in channel change time or some PVR commands during the periods when the DSL line is reporting error seconds. The "NE_CV/NE_ES" parameter is an example of a compound parameter indicative of a time taken to service an interactive command (e.g., a channel change or VOD command) provided by the user 65 of the IPTV application running on the STB 70. |

TABLE 1-continued

| Parameter | Source/Frequency | Definition | Technical Description | IPTV Importance |
|---|---|---|---|---|
| | | upstream packet sent from the gateway 69 that is detected by the access network 26 as corrupted. | | |
| NE_CV/NE_SESM | AccessCare 15 min | Near End Code Violations divided by Near End Severely Errored Seconds The "NE_CV" (near end code violations) parameter is an example of a parameter indicative of an incidence of upstream packets sent from the gateway 69 to the access network 26 having been detected by the access network 26 as corrupted. The "NE_SESM" (near end severely errored seconds) parameter is an example of a parameter indicative of an incidence of severely errored intervals, where a severely errored interval is a fixed-duration interval (e.g., a 1-second interval) containing more than a threshold number of upstream packets sent from the gateway 69 that are detected by the access network 26 as corrupted. | This ratio is an indicator of how the Code Violations in the upstream direction are distributed while the DSL connection is reporting severely errored seconds during the 15-min interval. | A high CV-to-SES ratio in the upstream direction suggests that CVs are also likely occurring outside of the intervals when the DSL connection is experiencing SES condition, and there is a high probability that slow response time in channel change or PVR commands will be experienced during the 15-min interval. The "NE_CV/NE_SESM" parameter is an example of a compound parameter indicative of an incidence of upstream packets having been corrupted outside the severely errored intervals. |
| NE_CV/PKTS_REQ | D-Server | AC 15 min | Near End Code Violations divided by Packets Requested The "NE_CV" (near end code violations) parameter is an example of a parameter indicative of an incidence of upstream packets sent from the gateway 69 to the access network 26 having been detected by the access network 26 as corrupted. The | Code violations in the upstream direction may impact the ability of the set-top box to request re-transmission of packets from the D-Server during the 15-min interval. | A high CV-to-Packet Requested ratio in the upstream direction will likely lead to unfilled holes, resulting in visual and/or audio impairments. The "NE_CV/PKTS_REQ" parameter is an example of a compound parameter indicative of a likelihood that a request for retransmission issued by the IPTV application |

TABLE 1-continued

| Parameter | Source/ Frequency | Definition | Technical Description | IPTV Importance |
|---|---|---|---|---|
| | | "PKTS_REQ" (packets requested) parameter is an example of a parameter indicative of an incidence of gaps between downstream packets received by the IPTV application running on the STB 70 from the gateway 69. | | running on the STB 70 will not reach the D-server of the content distribution entity 48. |
| NE_CV_SUB_HOLES | D-Server | AC 15 min | Near End Code Violations minus Number of Holes The "NE_CV" (near end code violations) parameter is an example of a parameter indicative of an incidence of upstream packets sent from the gateway 69 to the access network 26 having been detected by the access network 26 as corrupted. The "HOLES" (number of holes) parameter is an example of a parameter indicative of an incidence of gaps between downstream packets received by the IPTV application running on the STB 70 from the gateway 69. | Code violations in the upstream direction may impact the ability of the set-top box to request re-transmission of packets from the D-Server during the 15-min interval. | A negative value indicates that most/all packet retransmission requests should be received by the D-server. The "NE_CV_SUB_HOLES" parameter is an example of a compound parameter indicative of a likelihood that a request for retransmission issued by the IPTV application running on the STB 70 will not reach the D-server of the content distribution entity 48. |
| NE_CV_SUB_PKTS_REQ | D-Server | AC 15 min | Near End Code Violations minus Number of Packets Requested The "NE_CV" (near end code violations) parameter is an example of a parameter indicative of an incidence of upstream packets sent from the gateway 69 to the access network 26 having been detected by the access network 26 as corrupted. The "PKTS_RED" (packets requested) | Code violations in the upstream direction may impact the ability of the set-top box to request re-transmission of packets from the D-Serve during the 15-min interval. | A negative value indicates that most/all packet retransmission requests should be received by the D-server. The "NE_CV_SUB_PKTS_REQ" parameter is an example of a compound parameter indicative of a likelihood that a request for retransmission issued by the IPTV application running on the STB 70 will not reach the D-server of the content distribution entity |

TABLE 1-continued

| Parameter | Source/Frequency | Definition | Technical Description | IPTV Importance |
|---|---|---|---|---|
| | | parameter is an example of a parameter indicative of an incidence of gaps between downstream packets received by the IPTV application running on the STB 70 from the gateway 69. | | 48. |
| NE_ES | AccessCare 15 min | Near End-Errored Seconds This is a measure of errors in the DSL line for the upstream direction (i.e. from residential gateway to DSLAM), and will affect both IPTV and Internet packets being transmitted at the time of error condition. | Near End Errored Seconds refers to the count of 1-second intervals during which one or more: CRC anomalies, or defects such as severely errored frame (SEF), loss of signal (LOS), loss of power (LPR) are detected at the DSLAM (i.e. upstream) | The presence of error seconds is an indication of problems with the DSL connection which may impact the transmission, resulting in re-transmission of packets or packet loss. Uncorrected errors in the upstream direction may lead to slow response in channel change time or some PVR commands. |
| NE_HBER | AccessCare 15 min | Near End-High Bit Error Rate This parameter indicates that a high bit error rate is detected by the DSLAM (i.e. upstream). | A high bit error rate is an indication of the presence of disturbers such as high noise level in the DSL connection, as detected by the DSLAM. | A DSL connection with high bit error rate in the upstream direction will likely lead to slow response in channel change time and some PVR commands. |
| NE_LIA | AccessCare 15 min | Near End-Line Initiation Attempt This is a count of the number of DSL line attempt to re-syncs. | The NE_LIA counter is only registered by the DSLAM after a line re-sync has successfully been completed re-sync has been completed during the 15-min time interval. | IPTV service outage will occur during DSL line re-sync. |
| NE_LOLS | AccessCare 15 min | Near End-Loss of Link Seconds This is a count of 1-second intervals during which there is a loss of link for the DSL connection, as measured at the DSLAM over a 15-min interval. | Loss of Link may occur due to severely errored frame (SEF) defects, loss of signal (LOS), loss of power (LPR), etc. | A loss of link for the DSL connection will result in IPTV service outage. |
| NE_SESM | AccessCare 15 min | Near End-Severely Errored Second This measures the number of 1-sec intervals in which the DSL connection has experienced severe error conditions in the | This is a count of 1-second intervals during which there are: 18 or more CRC anomalies, or one or more LOS (loss of signal), SEF (severe errored frame) or LPR (loss of power) | A DSL connection with high count of severely errored seconds in the upstream direction will likely result in slow response in channel change time and/or some |

TABLE 1-continued

| Parameter | Source/ Frequency | Definition | Technical Description | IPTV Importance |
|---|---|---|---|---|
| | | upstream direction. | defects are detected at the DSLAM (i.e. upstream). | PVR commands. |
| NE_SFR | AccessCare 15 min | Near End-Superframe Received This is a measure of the amount of traffic being sent from the residential gateway to the DSLAM (i.e. upstream) | This is a count of the number of superframes (or blocks) received by the DSLAM from the residential gateway to the residential gateway during the 15-min interval (i.e. upstream) | includes both IPTV and Internet traffic |
| NE_SFT | AccessCare 15 min | Near End-Superframe Transmitted This is a measure of the amount of traffic being sent from the DSLAM to the residential gateway (i.e. downstream) | This is a count of the number of superframes (or blocks) sent from the DSLAM to the residential gateway during the 15-min interval (i.e. downstream). | includes both IPTV and Internet traffic |
| NE_UAS | AccessCare 15 min | Near End-Unavailable Second | By definition, a DSL line becomes unavailable at the onset of 10 contiguous SES (severely errored seconds). This parameter shows the count of 1-sec intervals during which the DSL line is unavailable at the DSLAM. | A DSL connection with unavailable second(s) in the upstream direction will lead to difficulty with channel change or some PVR commands during the 15-min interval. |
| PACKETS_REQUESTED | D-Server 15 min | Number of Packets Requested to be retransmitted to the set-top box from the D-Server | This is a count of the number of packets requested by the set-top box to be re-transmitted (for holes smaller than 150 ms) from the D-Server during the 15-min interval. | A high value of number of packets requested for retransmission indicates a higher probability of visual or audio impairment. |
| PACKETS_SERVICED | D-Server 15 min | Number of Packets requested to be retransmitted to the set-top box which have been fulfilled by the D-Sever | This is a count of the number of packets being re-transmitted from the D-Server to a set-top box during the 15-min interval. | A high value of number of packets |
| PKT_SERV_SUB_PKT_REQ | D-Server 15 min | Packets Serviced minus Packets Requested The "PKT_SERV" (packets serviced) parameter is an example of a parameter indicative of an incidence of missing downstream packets having been retransmitted by | This parameter provides an indication of how successful the D-Server is in fulfilling the request for packet retransmission by the set-top box. | A value of 0 indicates all requests for retransmission (for holes less than 150 ms) have been fulfilled by the D-Server. A negative value indicates that not all requests for retransmission have been fulfilled, which would result in visual or audio |

TABLE 1-continued

| Parameter | Source/Frequency | Definition | Technical Description | IPTV Importance |
|---|---|---|---|---|
| | | the D-server of the content distribution entity 48. The "PKT_REQ" (packets requested) parameter is an example of a parameter indicative of an incidence of missing downstream packets for which a request for retransmission has been issued by the IPTV application running on the STB 70. | | impairments. The "PKT_SERV_SUB_PKT_REQ" parameter is an example of a compound parameter indicative of a success rate of the D-server of the content distribution entity 48 in handling requests for retransmission issued by the IPTV application running on the STB 70. |
| REBOOT | CMS | 5530 | AccessCare | Number of Reboots This is a count of the number of times the residential gateway reboots during the 15-min time interval. | | IPTV service outage occurs when the residential gateway reboots. |
| RETRY_NUMBER | D-Server 15 min | Number of Holes encountered at the set-top box | This parameter counts the number of holes smaller than 150 ms encountered by the set-top box during the 15-min interval. | A high value of retry indicates a higher probability of visual or audio impairment. |
| TOTAL_HOLE_PKTS | Snapshot | Total Hole Packets is the total number of packets for all holes encountered by the set-top box | This is the total number of packets for all large holes and unfilled holes for all live TV channels. | This provides an indication of the number of packets required for retransmission. For holes greater than 150 ms, there will be no request for re-transmission, and visual/audio impairments will be experienced by IPTV customers. |
| TOTAL_PKTS_EXPIRED | Snapshot | Total Packets Expired is the total number of packets which took too long to arrive at the set-top box | This is the total number of expired packets (i.e. out-of-order packets or have taken too long to arrive) for all large holes and unfilled holes for all live TV channels. | A positive value indicates that visual and/or audio impairments will be experienced by the IPTV customer. |
| TOTAL_PKTS_RCVD | Snapshot | Total Packets Received is the total number of packets received by the set-top box. | This is a count of the total number of packets received for all live TV channels by the set-top box. | |
| TOTAL_PKTS_SENT | CMS Daily | Total Number of Packets Sent by Residential Gateway | A measure of the amount of traffic being sent by the residential gateway to devices connected | |

TABLE 1-continued

| Parameter | Source/Frequency | Definition | Technical Description | IPTV Importance |
|---|---|---|---|---|
| | | | to the home network. | |

In this embodiment, the IPTV service parameters may be categorized in different ways.

For example, in this embodiment, one way in which the IPTV service parameters may be categorized is based on where they are measured (e.g., in the subscriber premises $28_x$, in the access network 26, etc.). In particular, in this embodiment, some of the IPTV service parameters which are used by the service monitoring entity 45 to assess the QoE of the subscribers are measured in the access network 26. More specifically, in this embodiment, these parameters may be measured by the monitoring entity 58 of the access network 26. This is particularly useful as it can provide insight that could not be otherwise achieved when considering IPTV service parameters only measured by the end-user equipment $30_x$ at the subscriber premises $28_x$. For example, in this case, the "NE_CV" parameter, which refers to near end code violations reflecting a measure of errors conditions of the DSL connection in the upstream direction (i.e., towards the DSLAM 64), is based on measurements performed by the monitoring entity 58 of the access network 26.

As another example, in this embodiment, another way in which the IPTV service parameters may be categorized is by categorizing them as "independent" IPTV service parameters and "compound" IPTV service parameters.

An independent IPTV service parameter can be viewed as a metric which is directly measured and does not depend on another IPTV service parameter. For instance, one example of an independent IPTV service parameter that is listed in Table 1 is the "DISCARD_PKTS_SENT" parameter, which refers to the number of packets intended to be sent by the residential gateway 69 to the STB 70 but that have been discarded by the residential gateway 69 instead of being sent to the STB 70. Another example of an independent IPTV service parameter that is listed in Table 1 is the "PACKETS_REQUESTED" parameter, which refers to the number of packets requested to be retransmitted in requests for retransmission issued by the STB 70.

A "compound" IPTV service parameter can be viewed as a metric which is a function of a plurality of IPTV service parameters. A compound IPTV service parameter may provide insight that cannot be obtained when considering individually the IPTV service parameters on which it depends. For instance, one example of a compound IPTV service parameter that is listed in Table 1 is the "DISC_SENT/REQ" parameter, which refers to a ratio of the "DISCARD_PKTS_SENT" parameter (i.e., the number of packets intended to be sent by the residential gateway 69 to the STB 70 but that have been discarded by the residential gateway 69) and the "PACKETS_REQUESTED" parameter (i.e., the number of packets requested to be retransmitted in requests for retransmission issued by the STB 70). A ratio of 1:1 would strongly suggest that the holes encountered at the STB 70 are likely caused by the packets being discarded before being sent by the residential gateway 69. A high ratio may be an indication that the holes caused by the packets being discarded are larger than 150 ms (i.e., they are too large such that no request for retransmission is issued by the STB 70).

The function defining a given compound IPTV service parameter may take on various forms. In the examples of compound IPTV service parameters listed in Table 1, the function defining each compound parameter is purely arithmetic. More particularly, in these examples, the function defining a given compound IPTV service parameter is a division of one parameter by another or a subtraction of one parameter from another. Thus, in these examples, a given compound IPTV service parameter may be determined by determining an arithmetic difference between, or a quotient of, a first operand that comprises a first IPTV service parameter on which the given IPTV service compound parameter depends and a second operand that comprises a second IPTV service parameter on which the given IPTV service compound parameter depends, as the case may be. Instead of a quotient, a logarithmic difference may be equivalently used in some cases. The function defining a given compound IPTV service parameter may be more complex in other examples.

In this embodiment, a given compound IPTV service parameter may be a function of two or more other IPTV service parameters which gives an indication of a likelihood of a situation affecting QoE of the subscriber, possibly causing a service impairment for the subscriber (i.e., video and/or audio impairment, such as pixelation, screen freezing, etc.).

For example, when packets are dropped and the STB 70 encounters, the STB 70 issues requests for retransmission of the dropped packets for holes no greater than 150 ms. Based only on the number of retransmission requests received at a D-server of the content distribution entity 48 (the IPTV service parameter "RETRY_NUMBER"), one does not know whether some requests for retransmission sent to the D-Server get dropped before reaching the D-Server or whether packets retransmitted by the D-server get dropped before reaching the STB 70. However, a higher value of the IPTV service parameter "DISC_RCVD/HOLES" can indicate a higher likelihood of requests for retransmission from the STB 70 failing to reach the D-Server and resulting in visual and/or audio impairment for the subscriber.

As another example, requests for packet retransmission received by a D-server of the content distribution entity 48 indicate that packets are dropped before reaching the STB 70. Based on the number of retransmission requests alone, one cannot know whether the dropped packets are causing a service impairment for the subscriber. However, a higher value of the IPTV service parameter "DISC_SENT/REQ" can indicate that the holes caused by the packets being discarded are larger than 150 ms (i.e. they are too large so that no request for retransmission is issued), thus causing video and/or audio impairment for the subscriber.

Other examples of IPTV service parameters which give indications of likelihood of situations affecting QoE of the subscribers are presented in Table 1. Yet other examples may be envisaged in other embodiments.

The service monitoring entity 45 of the SHE 20 collects and processes the values of the IPTV service parameters to provide insight into the QoE of each of the subscribers.

More particularly, based on the values of the IPTV service parameters for the subscriber at the subscriber premises $28_x$, the service monitoring entity 45 derives information indicative of the QoE of the subscriber. This information, which will be referred to as "QoE information", can be derived in various ways.

For example, in this embodiment, the QoE information for the subscriber comprises a plurality of levels of QoE of the subscriber for different periods of time (e.g., a fraction of an hour, an hour, a day, a week, a month) which provide insight into the QoE of the subscriber at different degrees of temporal resolution or granularity. These levels of QoE are attributed by the service monitoring entity 45 based on the values of the IPTV service parameters. Since they can be viewed as basically rating the QoE of the subscriber, the levels of QoE of the subscriber that are determined by the service monitoring entity 45 can be viewed as "ratings of QoE". More particularly, in this embodiment, the QoE information comprises a QoE rating for every interval of fifteen minutes (hereinafter referred to as a "15-min QoE rating"), a QoE rating for every day (hereinafter referred to as a "daily QoE rating"), a QoE rating for every week (hereinafter referred to as a "weekly QoE rating"), and a QoE rating for every month (hereinafter referred to as a "monthly QoE rating").

Figure 5:
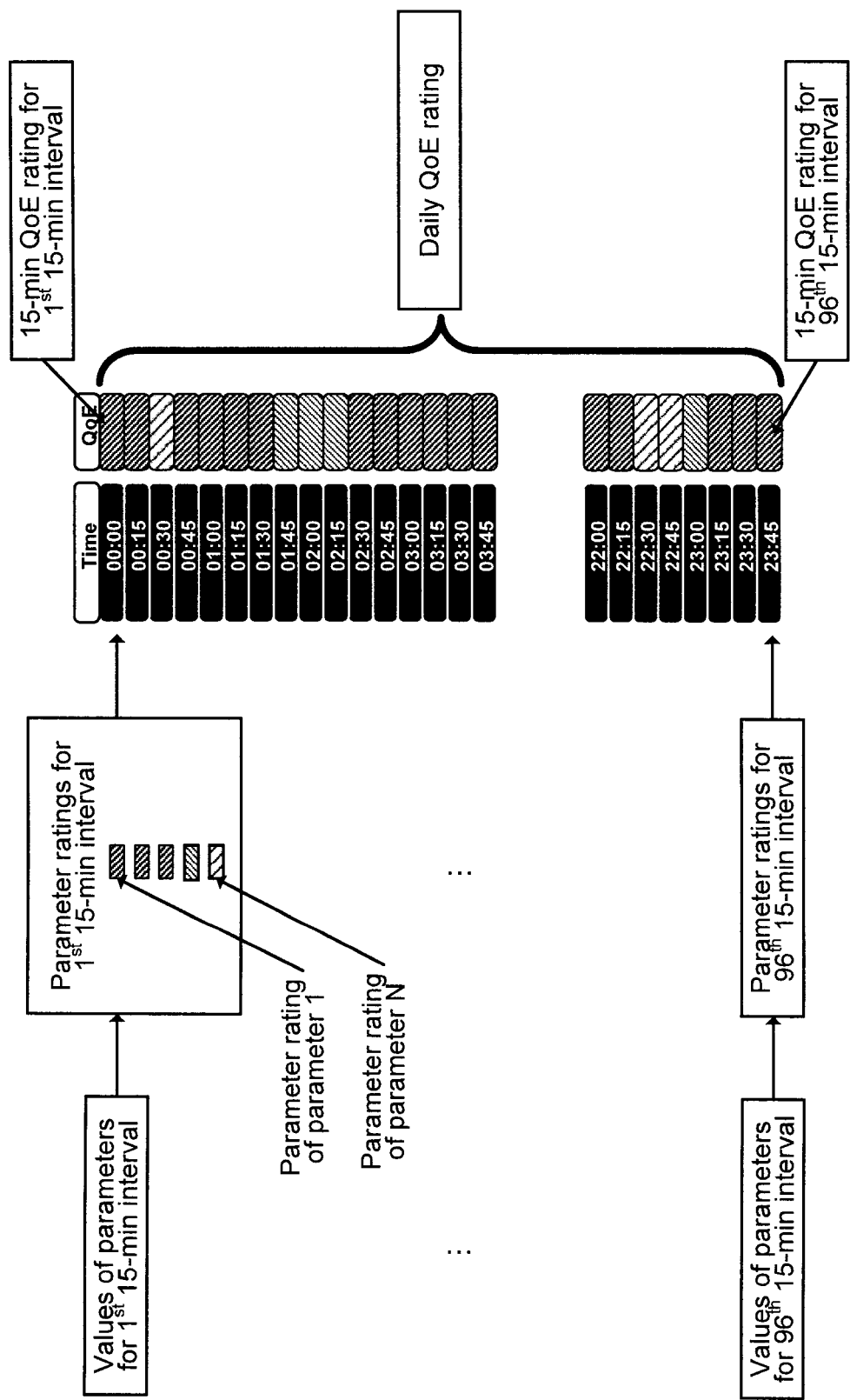
FIGS. 5 and 6 show an example of a process to determine levels of quality of experience of a subscriber for different periods of time.
Figure 6:
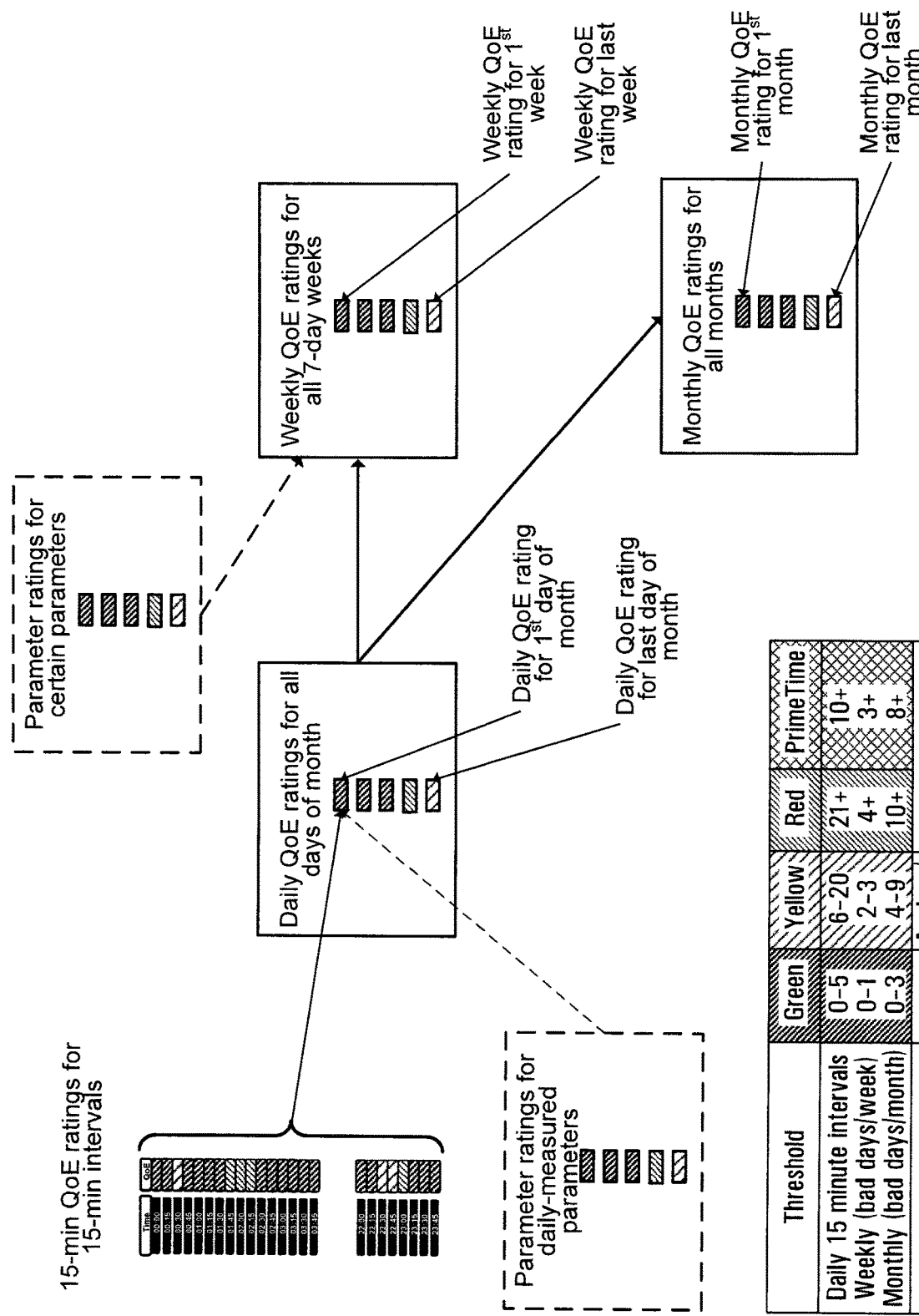

The QoE ratings can be derived in many different ways based on the values of the IPTV service parameters for the subscriber. An example of how the QoE ratings for the subscriber may be derived in this embodiment will now be discussed, with additional reference to FIGS. 5 and 6.

a) 15-min QoE Rating

The values of the IPTV service parameters which are measured every 15 minutes are rated to obtain ratings for these parameters. These ratings, which will be referred to as "parameter ratings", are taken from a set of potential parameter ratings which constitute a parameter rating scale. The parameter rating scale can take on various forms. For example, as shown in Table 2, in this embodiment, the parameter rating scale includes three potential parameter ratings, namely "green", "yellow", and "red". The value of a given IPTV service parameter for a particular 15-min interval may be attributed: the "green" parameter rating when it is considered to be in a normal or standard range for this parameter; the "yellow" parameter rating when it is considered to be outside the normal or standard range for this particular parameter by a degree which is unlikely to be indicative of a problem affecting the subscribers QoE; and the "red" parameter rating when it is considered to be so outside the normal or standard range for this particular parameter that it likely indicates a problem affecting the subscriber's QoE.

In this embodiment, a parameter rating is attributed to the value of a given IPTV service parameter for a particular 15-min interval by comparing this value to one or more thresholds. Such thresholds may be determined by the service provider (e.g., based on conditions which clearly demonstrate impairments of the IPTV service to the subscriber). Examples of such thresholds are provided in Table 2.

For example, in this case, the value of the "DISCARD_PKTS_SENT" parameter for a particular 15-min interval is compared to a first threshold of 200 discarded packets and a second threshold of 9000 discarded packets. If the value of the "DISCARD_PKTS_SENT" parameter is less than or equal to 200, it is attributed the "green" parameter rating. If the value of the "DISCARD_PKTS_SENT" parameter is greater than or equal to 9000, it is attributed the "red" parameter rating. If the value of the "DISCARD_PKTS_SENT" parameter is between 200 and 9000, it is attributed the "yellow" parameter rating.

The 15-min QoE rating for the subscriber for a particular 15-min interval is derived on a basis of the parameter ratings of the values of the IPTV service parameters for the particular 15-min interval. Specifically, in this example, the 15-min QoE rating for the subscriber for the particular 15-min interval is taken from a set of potential 15-min QoE ratings which forms a 15-min QoE rating scale or range. For example, in this embodiment, the 15-min QoE rating scale or range includes four potential 15-min QoE ratings, namely "green", "yellow", "red", and "blue" (which are represented by different cross-hatching patterns in FIGS. 5 and 6). A "green" 15-min QoE rating may be attributed when the subscribers QoE is deemed to be normal or standard for the particular 15-min interval. A "yellow" 15-min QoE rating may be attributed when the subscriber's QoE is deemed to be affected by a relatively minor issue during the particular 15-min interval. A "red" 15-min QoE rating may be attributed when the subscriber's QoE is deemed to be affected by a relatively major issue during the particular 15-min interval. A "blue" 15-min QoE rating may be attributed when the subscriber's QoE is deemed to be affected by an issue during a primetime viewing period, which is determined by the service provider (e.g., 8:00 pm to 11:00 pm Eastern and Pacific and 7:00 pm to 10:00 pm Central and Mountain from Monday to Saturday, and 7:00 pm to 11:00 pm Eastern and Pacific and 6:00 pm to 10:00 pm Central and Mountain on Sunday).

The 15-min QoE rating for the subscriber for the particular 15-min interval is determined based on criteria defined in terms of the parameter ratings of the values of the IPTV service parameters for the particular 15-min interval. For instance, in this example:

If every one of the parameter ratings of the values of the IPTV service parameters for the particular 15-min interval is the "green" parameter rating, then the 15-min QoE rating for the particular 15-min interval is the "green" QoE rating.

If any of the parameter ratings of the values of the IPTV service parameters for the particular 15-min interval is the "red" parameter rating, then the 15-min QoE rating for the particular 15-min interval is the "red" QoE rating.

If any of the parameter ratings of the values of the IPTV service parameters for the particular 15-min interval is the "yellow" parameter rating but none of these parameter ratings is the "red" parameter rating, then the 15-min QoE rating for the particular 15-min interval may be the "yellow" QoE rating or the "red" QoE rating, depending on the number of "yellow" parameter ratings for the particular 15-min interval. For instance, if the number of "yellow" parameter ratings for the particular 15-min interval is below a threshold (e.g., 4 or any other number), the 15-min QoE rating for the particular 15-min interval may be the "yellow" QoE rating; otherwise, if the number of "yellow" parameter ratings for the particular 15-min interval is at or above the threshold, the 15-min QoE rating for the particular 15-min interval may be the "red" QoE rating.

If the particular 15-min interval falls within a primetime viewing period determined by the service provider and any of the parameter ratings of the values of the IPTV service parameters for the particular 15-min interval is the "yellow" or "red" parameter rating, then the 15-min QoE rating for the particular 15-min interval is the "blue" QoE rating.

Various other criteria may be applied in other embodiments to attribute the 15-min QoE rating for the particular 15-min interval.

This approach is applied to each of the ninety-six 15-min intervals in a day in order to obtain ninety-six 15-min QoE ratings for the subscriber for that day.

The 15-min QoE ratings for the subscriber are examples of intraday ratings for periods of time shorter than one day that can be attributed. In other embodiments, intraday ratings for longer or shorter periods of time can be used (e.g., 5-min QoE ratings, 30-min QoE ratings, 1-hour QoE ratings, 3-hour QoE ratings, etc.).

TABLE 2

| | Thresholds | | |
|---|---|---|---|
| Measure | Red | Yellow | Green |
| CRASH_COUNT | 1 | Only Red or Green | 0 |
| DISC_RCVD/HOLES | 200+ | 101-199 | <=100 |
| DISC_RCVD/REQ | 200+ | 101-199 | <=100 |
| DISC_SENT/HOLES | 200+ | 101-199 | <=100 |
| DISC_SENT/REQ | 200+ | 101-199 | <=100 |
| DISCARD_PKTS_RCVD | 9000+ | 201-8999 | <=200 |
| DISCARD_PKTS_SENT | 9000+ | 201-8999 | <=200 |
| ERRORS_RCVD | 150,000+ | Not defined but will use a blended metric to determine status | <=200 |
| ERRORS_SENT | 150,000+ | Not defined but will use a blended metric to determine status | <=200 |
| FE_CB | No Threshold | No Threshold | No Threshold |
| FE_CV | 9,000+ | Not defined but will use a blended metric to determine status | <=200 |
| FE_CV/FE_ES | 100+ | 11-99 | <=10 |
| FE_CV/FE_SESM | 100+ | 11-99 | <=10 |
| FE_CV/HOLES | 100+ | 11-99 | <=10 |
| FE_CV/PKTS_REQ | 100+ | 11-99 | <=10 |
| FE_CV_SUB_HOLES | 1000+ | 11-999 | <=10 |
| FE_CV_SUB_PKTS_REQ | 1000+ | 11-999 | <=10 |
| FE_ES | No Threshold Not an indicator on it's own but used as a combined measure with others | No Threshold Not an indicator on it's own but used as a combined measure with others | No Threshold Not an indicator on it's own but used as a combined measure with others |
| FE_HBER | 5+ | 1-4 | 0 |
| FE_SESM | 5+ | 1-4 | 0 |
| FE_SFR | No Threshold | No Threshold | No Threshold |
| FE_SFT | No Threshold | No Threshold | No Threshold |
| FE_UAS | 5+ | 1-4 | 0 |
| ISW | 40+ | 11-39 | <=10 |
| Link Resync | 2 | 1 | 0 |
| MAX_HOLE_SIZE | No Threshold | No Threshold | No Threshold |
| NE_CB | No Threshold | No Threshold | No Threshold |
| NE_CV | 9,000+ | Not defined but will use a blended metric to determine status | <=200 |
| NE_CV/HOLES | 100+ | 11'99 | <=10 |
| NE_CV/NE_ES | 100+ | 11'99 | <=10 |
| NE_CV/NE_SESM | 100+ | 11'99 | <=10 |
| NE_CV/PKTS_REQ | 100+ | 11'99 | <=10 |
| NE_CV_SUB_HOLES | 1000+ | 11-999 | <=10 |
| NE_CV_SUB_PKTS_REQ | 1,000+ | 11-999 | <=10 |

TABLE 2-continued

| | Thresholds | | |
|---|---|---|---|
| Measure | Red | Yellow | Green |
| NE_ES | No Threshold Not an indicator on it's own but used as a combined measure with others | No Threshold Not an indicator on it's own but used as a combined measure with others | No Threshold Not an indicator on it's own but used as a combined measure with others |
| NE_HBER | 5+ | 1-4 | 0 |
| NE_LIA | 1 | Either Red or Green nothing in between | 0 |
| NE_LOLS | 5+ | 1-4 | 0 |
| NE_SESM | 5+ | 1-4 | 0 |
| NE_SFR | No Threshold | No Threshold | No Threshold |
| NE_SFT | No Threshold | No Threshold | No Threshold |
| NE_UAS | 5+ | 1-4 | 0 |
| PACKETS_REQUESTED | 4500+ | Not defined but will use a blended metric to determine status | <=70 |
| PACKETS_SERVICED | No Threshold | No Threshold | No Threshold |
| PKT_SERV_SUB_PKT_REQ | <=-5 | -4 to 0 | 0 |
| REBOOT | 1 | Only Red or Green | 0 |
| RETRY_NUMBER | 4500+ | Not defined but will use a blended metric to determine status | <=70 |
| TOTAL_HOLE_PKTS | No Threshold | No Threshold | No Threshold |
| TOTAL_PKTS_EXPIRED | 5+ | 1-4 | 0 |
| TOTAL_PKTS_RCVD | No Threshold | No Threshold | No Threshold |
| TOTAL_PKTS_SENT | No Threshold | No Threshold | No Threshold | b) Daily QoE Rating

The daily QoE rating for the subscriber for a particular day is determined on a basis of the ninety-six 15-min QoE ratings for the subscriber for that day. Specifically, in this example, the daily QoE rating for the subscriber for the particular day is taken from a set of potential daily QoE ratings which forms a daily QoE rating scale or range. For example, in this embodiment, the daily QoE rating scale includes four potential daily QoE ratings, namely "green", "yellow", "red", and "blue". A "green" daily QoE rating may be attributed when the subscriber's QoE is deemed to be normal or standard for the particular day. A "yellow" daily QoE rating may be attributed when the subscriber's QoE is deemed to be detrimentally affected by a relatively minor issue on the particular day. A "red" daily QoE rating may be attributed when the subscriber's QoE is deemed to be detrimentally affected by a relatively major issue on the particular day. A "blue" daily QoE rating may be attributed when the subscriber's QoE is deemed to be detrimentally affected by an issue during a primetime viewing period on the particular day.

The daily QoE rating for the subscriber for the particular day is determined based on criteria defined in terms of the ninety-six 15-min QoE ratings for the subscriber for that day. For instance, in this example:
  If the number of "yellow" and "red" 15-min QoE ratings for the particular day is less than or equal to a first threshold, in this case five, then the daily QoE rating for the particular day is the "green" daily QoE rating.
  If the number of "yellow" and "red" 15-min QoE ratings for the particular day is greater than the first threshold but less than or equal to a second threshold, in this case twenty, then the daily QoE rating for the particular day is the "yellow" daily QoE rating.

If the number of "yellow" and "red" 15-min QoE ratings for the particular day is greater than the second threshold, then the daily QoE rating for the particular day is the "red" daily QoE rating.

If the number of "blue" 15-min QoE ratings for the particular day is greater than or equal to a given threshold, in this case 10, then the daily QoE rating for the particular day is the "blue" daily QoE rating.

The criteria on which the daily QoE rating for the subscriber for the particular day is determined may also take into account the values of the IPTV service parameters which are measured every day. For instance, the value of a given IPTV service parameter which is measured every day is rated to obtain a parameter rating. As discussed above, and as shown in Table 2, in this embodiment, the "green", "yellow", and "red" parameter rating is attributed to the value of the given IPTV service parameter for a particular day by comparing this value to one or more thresholds, which are determined by the service provider. As an example, in this case, the value of the "ERRORS_SENT" parameter for a particular day, which refers to the number of errors in the IPTV packets detected by the residential gateway 69, is compared to a first threshold number of 200 errors and a second threshold of 150000 discarded packets. If the value of the "ERRORS_SENT" parameter is less than or equal to 200, it is attributed the "green" parameter rating. If the value of the "ERRORS_SENT" parameter is greater than or equal to 150000, it is attributed the "red" parameter rating. If the value of the "ERRORS_SENT" parameter is between 200 and 150000, it is attributed the "yellow" parameter rating. In such cases, if any of the parameter ratings of the values of the IPTV service parameters for the particular day is the "red" parameter rating, then the daily QoE rating for the particular day is the "red" daily QoE rating, regardless of what are the 15-min QoE ratings for the particular day.

Various other criteria may be applied in other embodiments to attribute the daily QoE rating for the particular day.

This approach is applied to each of the seven days in a week in order to obtain seven daily QoE ratings for the subscriber for that week.

c) Weekly QoE Rating

The weekly QoE rating for the subscriber for a particular week is obtained on a basis of the seven daily QoE ratings for the subscriber for that week. Specifically, in this example, the weekly QoE rating for the subscriber for the particular week is taken from a set of potential weekly QoE ratings which forms a weekly QoE rating scale or range. For example, in this embodiment, the weekly QoE rating scale includes four potential weekly QoE ratings, namely "green", "yellow", "red", and "blue". A "green" weekly QoE rating may be attributed when the subscriber's QoE is deemed to be normal or standard for the particular week. A "yellow" weekly QoE rating may be attributed when the subscriber's QoE is deemed to be detrimentally affected by a relatively minor issue on the particular week. A "red" weekly QoE rating may be attributed when the subscriber's QoE is deemed to be detrimentally affected by a relatively major issue on the particular week. A "blue" weekly QoE rating may be attributed when the subscriber's QoE is deemed to be detrimentally affected by an issue during a primetime viewing period during the particular week.

The weekly QoE rating for the subscriber for the particular week is determined based on criteria defined in terms of the seven daily QoE ratings for the subscriber for that week. For instance, in this example:

If the number of "red" daily QoE ratings for the particular week is less than or equal to a first threshold, in this case one, then the weekly QoE rating for the particular week is the "green" weekly QoE rating.

If the number of "red" daily QoE ratings for the particular week is greater than the first threshold but less than or equal to a second threshold, in this case three, then the weekly QoE rating for the particular week is the "yellow" weekly QoE rating.

If the number of "red" daily QoE ratings for the particular week is greater than the second threshold, then the weekly QoE rating for the particular week is the "red" weekly QoE rating.

If the number of "blue" daily QoE ratings for the particular week is greater than or equal to a given threshold, in this case 3, then the weekly QoE rating for the particular week is the "blue" weekly QoE rating.

The criteria on which the weekly QoE rating for the subscriber for the particular week is determined may also take into account the parameter ratings of certain IPTV service parameters. For instance, the parameter rating of a given IPTV service parameter may be considered to be of sufficient importance that, if it is "red" parameter rating, the weekly QoE rating for the particular week is the "red" weekly QoE rating, regardless of what are the daily QoE ratings for the particular week. As an example, in this case, if the "REBOOT" parameter, which refers to the number of reboots of the residential gateway 69, was attributed the "red" parameter rating anytime during the particular week, the weekly QoE rating for the particular week is the "red" weekly QoE rating, regardless of what are the daily QoE ratings for the particular week.

Various other criteria may be applied in other embodiments to attribute the weekly QoE rating for the particular week.

d) Monthly QoE Rating

The monthly QoE rating for the subscriber for a particular month is obtained on a basis of the daily QoE ratings for the subscriber for that month, in a manner similar to that discussed above in respect of the weekly QoE ratings.

The QoE information for each of the subscribers, including the QoE ratings for each of the subscribers, is recorded and stored in the database 83 of the service monitoring entity 45. The database 83 is implemented by data storage media, which may store data optically (e.g., an optical disk such as a CD-ROM or a DVD), magnetically (e.g., a hard disk drive, a removable diskette), electrically (e.g., semiconductor memory, floating-gate transistor memory, etc.), and/or in various other ways.

By including the 15-min, daily, weekly, and monthly QoE ratings for the subscribers, the QoE information stored in the database 83 maintains a history of each subscriber's QoE which spans several weeks or months (e.g., a rolling period of six months or more) and which can be analyzed on a 15-min, daily, weekly or monthly basis. This archive can allow the service provider to identify issues or trends with respect to each subscriber's QoE. For example, the historical QoE information can allow the service provider to identify recurring issues or patterns experienced by individual subscribers. In order to optimize data storage efficiency, in some embodiments, the historical QoE information stored in the database 83 may be pruned to retain only items of information pertaining to issues experienced by the subscribers. For instance, only the QoE information reflecting "yellow", "red" or "blue" QoE ratings may be retained.

The QoE information derived by the service monitoring entity 45 can be used in various ways. Generally, based on the QoE information, the service monitoring entity 45 provides a service assurance capability to enable the service provider to know how each subscriber is doing, know where and when trouble or issues arise, and therefore reduce the time and cost to resolve such trouble or issues.

For example, in this embodiment, a user 86 may use a monitoring tool provided by a user device 87 to gain insight into the QoE of the subscribers based on the QoE information derived by the service monitoring entity 45. For instance, in various cases, the user 86 may be a helpdesk agent or other customer service representative, a technician, a network engineer, an executive or other manager, or some other employee of the service provider. The user device 87 comprises an input portion (e.g., a keyboard, a touchscreen, and/or a mouse or other pointing device), an output portion comprising a display and possibly other output components (e.g., a speaker), and a processing portion to process data allowing the monitoring tool to be used by the user 86. In this embodiment, the user device 87 is a personal computer (e.g., a workstation, a desktop computer, a laptop computer, etc.). In other embodiments, the user device 87 may take on other forms (e.g., a mobile phone, a portable technician terminal, etc.).

The monitoring tool is implemented by a monitoring tool application 85. In this embodiment, the monitoring tool application 85 is executed by the processing entity 59 of the service monitoring entity 45. The monitoring tool comprises a graphical user interface (GUI) implemented on the user device 87. The user device 87 is connected to the service monitoring entity 45 via a communications link 55, which may be a wired or wireless link.

The monitoring tool enables the user 86 to interact with its GUI in order to request and be presented with meaningful representations of the QoE information stored in the database 83. The GUI may provide charts, tables, lists and/or any other graphical representation of selected portions of the QoE information stored in the database 83 that are to be presented to the user 86.

Figure 8:
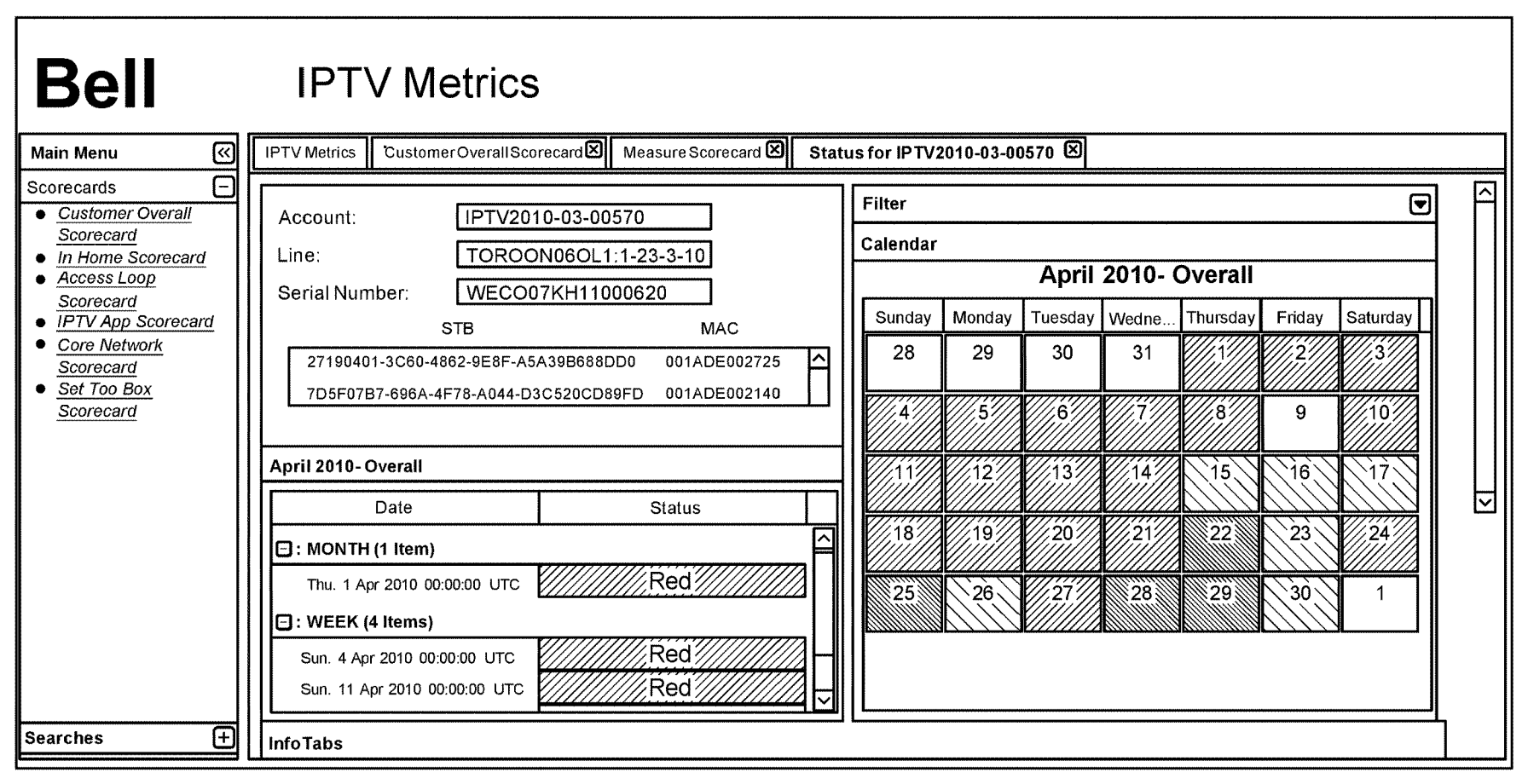
Figure 9:
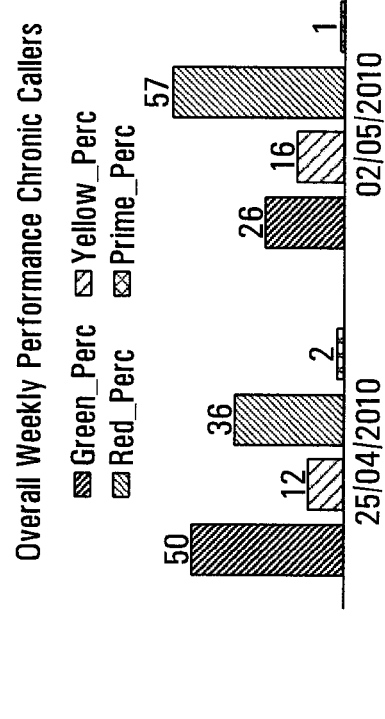
Figure 10:
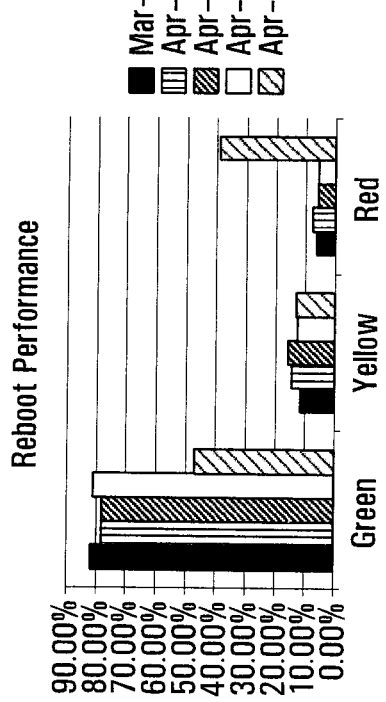
Figure 11:
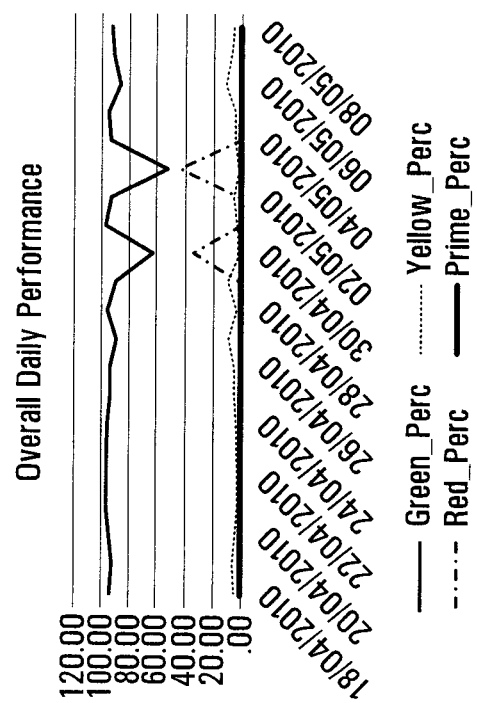

For instance, FIGS. 7 to 11 show examples of manifestations of the GUI on the computer 86 in this embodiment. In FIG. 7, a set of tables presents the daily, weekly, and monthly QoE ratings for the subscribers in terms of proportions of the subscribers which had "green", "yellow", "red" and "blue" QoE ratings for particulars days, weeks and months. For instance, the table indicates that, on May 18, 2010, 84.05% of the subscribers had "green" daily QoE ratings, 2.45% of the subscribers had "yellow" daily QoE ratings, 6.86% of the subscribers had "red" daily QoE ratings, and 6.63% of the subscribers had "blue" daily QoE ratings. In FIG. 8, the daily, weekly, and monthly QoE ratings for a given subscriber are presented by a calendar which conveys the daily QoE rating for each particular day, a list which conveys the weekly QoE rating for each particular week, and another list which conveys the monthly QoE rating for each particular month. For instance, the calendar and the lists indicate that the subscriber had "red" daily QoE ratings from April 18 to Apr. 21, 2010, a "green" daily QoE rating on Apr. 22, 2010, and a "yellow" daily QoE rating on Apr. 23, 2010, the subscriber had "red" weekly QoE ratings for the weeks of April 4 and Apr. 11, 2010, and the subscriber had a "red" monthly QoE rating for the month of April 2010. In FIGS. 9 to 11, different performance charts are presented.

Various other charts, tables, lists and/or other graphical representations of selected portions of the QoE information stored in the database 83 may be presented to the user 86 via the GUI of the monitoring tool (e.g., representations of the 15-min QoE ratings for a given subscriber, representations of individual ones of the IPTV service parameters for a given subscriber, etc.).

Based on the QoE information stored in the database 83, the user 86 may be alerted to situations affecting the QoE of subscribers. For example, when a particular IPTV service parameter (e.g., a given compound IPTV service parameters indicative of a likelihood of a situation affecting the QoE of a subscriber) is attributed a "red" parameter rating or a particular period of time (e.g., a 15-min interval, a day, a week, or a month) is attributed a "red" QoE rating, output of the "red" parameter rating or "red" QoE rating on the GUI of the computer 86 provides an alert alerting the user 86 to the fact that a situation is potentially affecting the QoE of the subscriber. Other forms of alerts (e.g., pop-up windows, email messages, etc.) may be issued in other embodiments.

The user 86 can use the monitoring tool provided by the user device 87 in order to assess the quality of the IPTV service provided to the subscribers in general or to specific subscribers, to identify issues in connection with this service, and establish corrective actions to resolve these issues.

Figure 12:
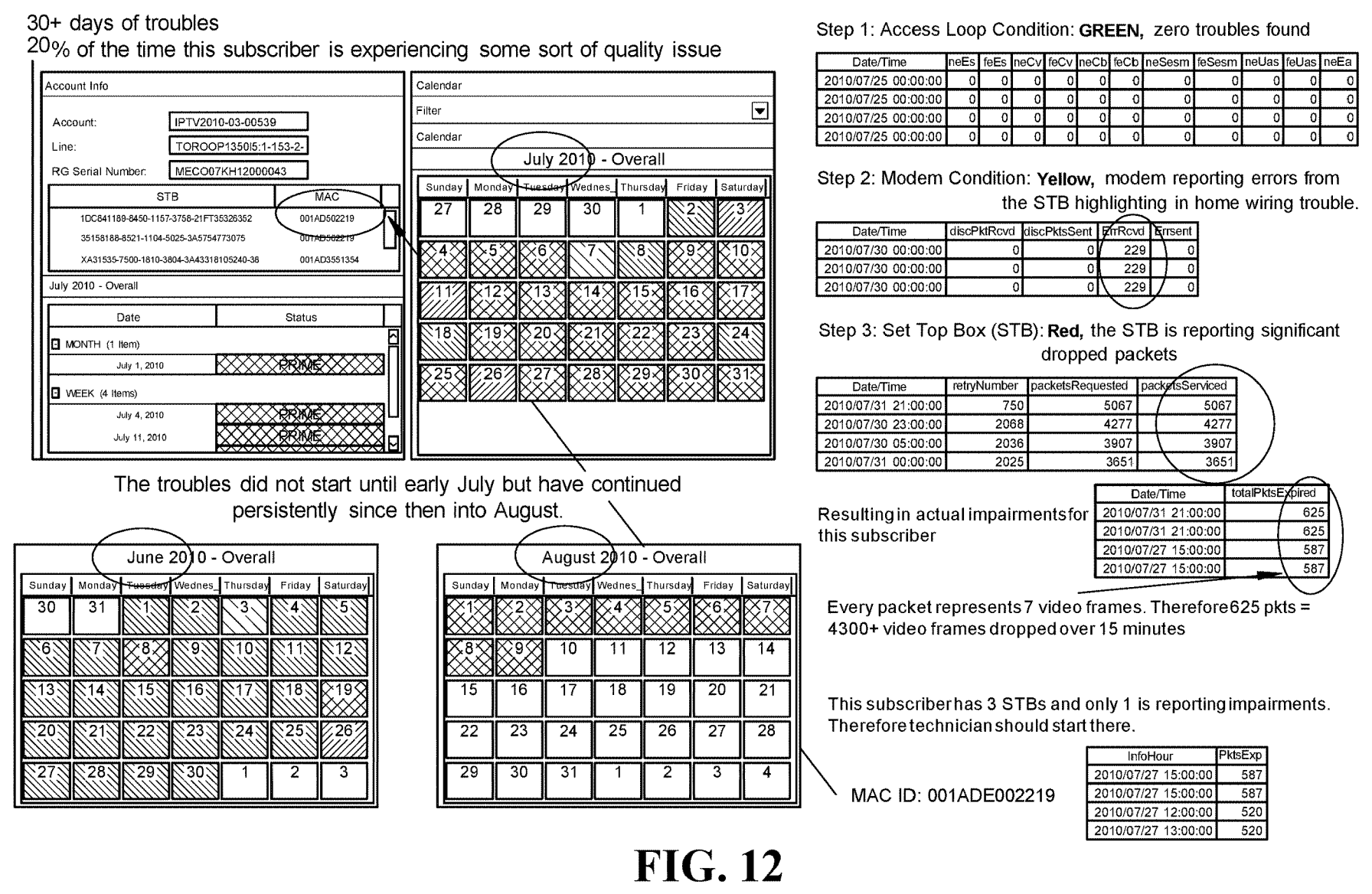

For example, in cases in which the user 86 is a helpdesk agent or technician who is handling a subscriber's complaint about the IPTV service being poor, the QoE information accessible via the monitoring tool provided by the user device 87 may help the helpdesk agent or technician diagnose the trouble the subscriber is experiencing and be able to fix it as quickly and efficiently as possible. For instance, FIG. 12 shows how the user 86 can use the monitoring tool via the user device 87 to identify the root cause of a subscriber's issue as likely being a particular STB at the subscriber's premises. In particular, since the QoE information reflects the status of the access network 26, the user 86 can exclude the DSL connection as the root cause of the subscriber's issue.

As another example, in some cases, the user 86 may proactively review the QoE information accessible via the monitoring tool provided by the user device 87 to identify specific subscribers experiencing poor service quality (e.g., subscribers having a "red" weekly QoE rating) and reach out to them to resolve the issues before these subscribers notice the poor service or contact the service provider. For instance, the user 86 may contact a given subscriber identified as experiencing poor service to explain the situation and provide a solution to the problem (e.g., instruct the given subscriber to change a cable between the STB 70 and the residential gateway 69, advise the given subscriber that a technician can stop by to resolve the problem, etc.).

Alternatively or additionally, in some embodiments, the processing entity 59 of the service monitoring entity 45 may proactively analyse the QoE information for the subscribers in order to identify specific subscribers experiencing poor service quality (e.g., subscribers having a "red" weekly QoE rating) and automatically take actions to resolve the issues before these subscribers notice the poor service and contact the service provider. For instance, the service monitoring entity 45 may send a communication (e.g., an email, a voice mail, an internal log communication etc.) to a helpdesk agent or a technician to advise of a given subscriber identified as experiencing poor service to explain the situation and provide a solution to the problem. As another example, the service monitoring entity 45 may send a communication (e.g., an email, a voice mail, etc.) to the given subscriber identified as experiencing poor service to explain the situation and provide a solution to the problem (e.g., advise the given subscriber that a technician can stop by to resolve the problem, etc.).

While in the examples considered above the user 86 is an employee of the service provider, in other examples, the user 86 may be the subscriber, who can use the monitoring tool provided by the user device 87 to access the QoE information pertaining to his/her subscription.

Figure 13:
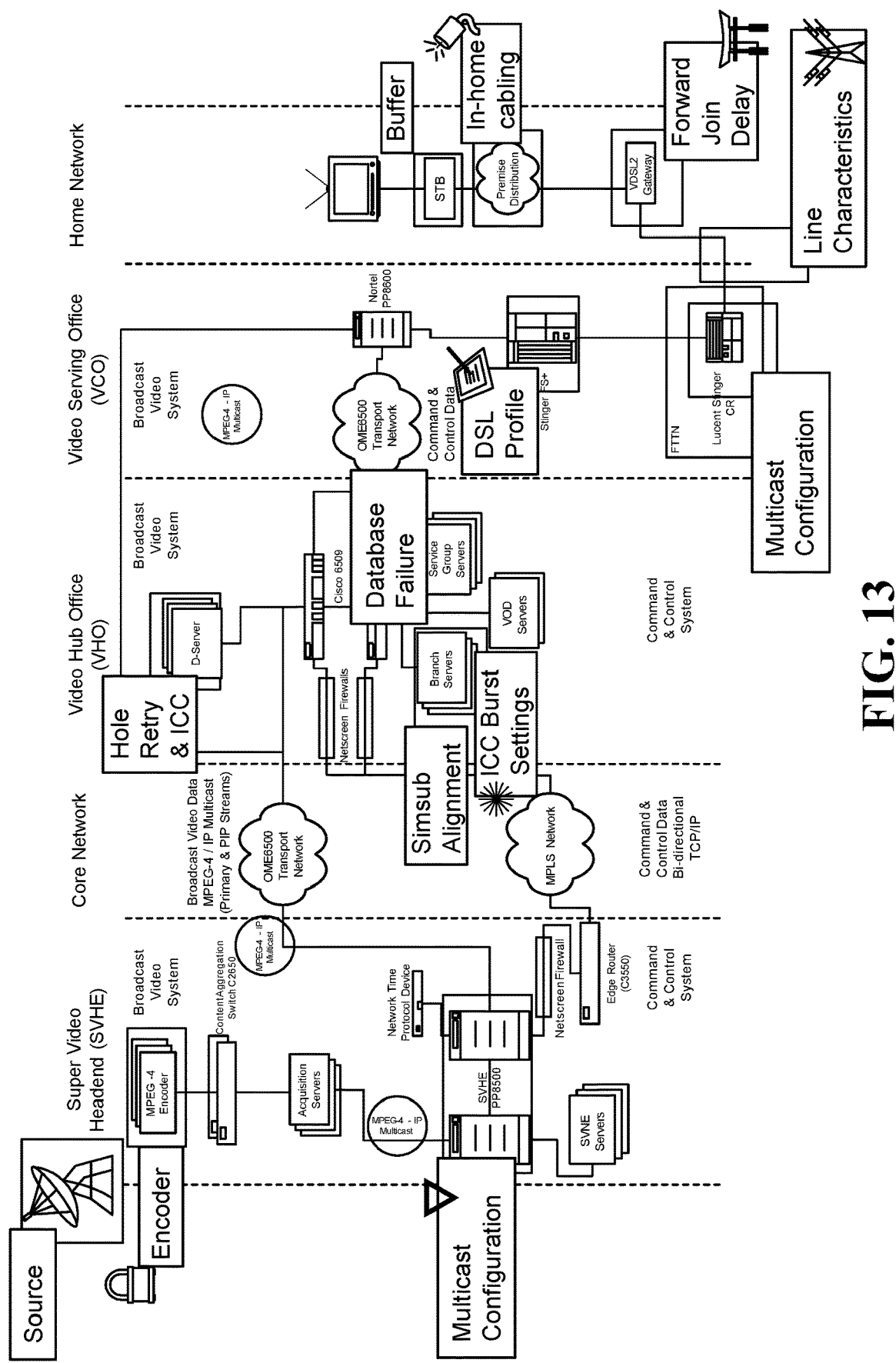
FIG. 13 shows an example of a more detailed network architecture over which the IPTV service can be delivered.

Another way in which the QoE information derived by the service monitoring entity 45 can be used is to assess performance of the network 10. Such assessments can give insight into how well the IPTV service is provisioned by the service provider, isolate chronic issues, serve to develop better provisioning standards/guidelines and training programs for technicians, and/or rationalize added investments in connection with the IPTV service. For example, this may be used to isolate problems by identifying which network components (e.g., in the SHE 20, in the core network 22, in the access network 26 or in the end-user equipment $30_x$) are causing these problems. For instance, FIG. 13 shows an example of a more detailed architecture over which the IPTV service may be delivered, with rectangular boxes illustrating potential areas where issues affecting delivery of the IPTV service may be encountered.

Although in embodiments discussed above the service monitoring entity 45 and the QoE information that it derives pertain to an IPTV service, in other embodiments, principles discussed herein may apply to other services that can be provided over the packet-switched network 13. For example, in other embodiments, principles discussed herein may apply to an Internet access service and/or a VoIP service provided over the packet-switched network 13. For instance, in such embodiments, a service monitoring entity similar to the service monitoring entity 45 may derive QoE information for subscribers of the Internet access service and/or the VoIP service on a basis of parameters similar to the IPTV service parameters discussed above (e.g., with different thresholds being used in attributing QoE ratings to the parameter values).

While in embodiments considered above, the end-user equipment $30_1$-$30_N$ of the subscribers is located at the subscriber premises $28_1$-$28_N$ and the communication links $63_1$-$63_N$ of the access network 26 include wired links leading to the end-user equipment $30_1$-$30_N$, in other embodiments, the end-user equipment $30_1$-$30_N$ of the subscribers may include mobile wireless devices (e.g., cellular phones) and the communication links $63_1$-$63_N$ may include wireless links (e.g., cellular links) over which the services are delivered.

Those skilled in the art will appreciate that, in some embodiments, a given component described herein (e.g., the service monitoring entity 45) may comprise one or more pre-programmed hardware or firmware elements (e.g., application specific integrated circuits (ASICs), electrically erasable programmable read-only memories (EEPROMs), etc.) or other related elements to implement at least some functionality of that given component. In other embodiments, a given component described herein (e.g., the service monitoring entity 45) may comprise a processor having access to a memory which stores program instructions for execution by the processor to implement at least some functionality of that given component. The program instructions may be stored on data storage media that is fixed, tangible, and readable directly by the processor. The data storage media may store data optically (e.g., an optical disk such as a CD-ROM or a DVD), magnetically (e.g., a hard disk drive, a removable diskette), electrically (e.g., semiconductor memory, floating-gate transistor memory, etc.), and/or in various other ways. Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the invention have been described and illustrated, it will be apparent to those skilled in the art that numerous modifications and variations can be made without departing from the scope of the invention, which is defined in the appended claims.

The invention claimed is:

1. A method for assessing a quality of experience (QoE) of an internet protocol television (IPTV) service provided to a subscriber, the method comprising:

receiving a plurality of service parameter values of at least a first service parameter and a second service parameter, each of the service parameter values representative of the first service parameter or the second service parameter collected during a respective one of a plurality of collection intervals of a defined length of time, the service parameter values received from one or more of:
 a residential gateway of the subscriber;
 a set top box of the subscriber; and
 an access network system;

determining a collection interval quality of experience (QoE) rating for each of the collection intervals based on the received service parameter values collected during the respective collection interval, each of the determined collection interval QoE ratings being one of a plurality of predefined QoE ratings, wherein determining the collection interval quality of experience (QoE) rating for each of the collection intervals comprises:
 determining a compound service parameter value representative of a ratio of the first service parameter value to the second service parameter value, wherein the ratio is at least one of:
  number of discarded packets received (DISC_RCVD) to the number of holes (HOLES);
  DISC_RCVD to the number of packets requested (REQ);
  number of discarded packets sent (DISC_SENT) to HOLES;
  DISC_SENT to REQ;
  far end code violations (FE_CV) to the far end errored seconds (FE_ES);
  FE_CV to the far end severely errored seconds (FE SESM):
  FE_CV to HOLES;
  FE_CV to REQ;
  near end code violations (NE_CV) to the near end errored seconds (NE_ES);
  NE_CV to the near end severely errored seconds (NE_SESM);
  NE_CV to HOLES; and
  NE_CV to REQ; and
 determining the collection interval QoE rating based on the compound service parameter value;

storing the determined collection interval QoE ratings and the received service parameter values for the plurality of collection intervals in a database;

determining first aggregated QoE ratings each based on a plurality of collection interval QoE ratings from a first aggregation length of time that is an integer multiple of the determined length of time of the collection interval;

storing the determined first aggregated QoE ratings in the database;

determining second aggregated QoE ratings based on a plurality of first aggregated QoE ratings from a second aggregation length of time that is an integer multiple of the first aggregation length of time;

storing the determined second aggregated QoE ratings in the database; and generating a user interface comprising a plurality of indications of data stored in the database, each of the plurality of indications representing one of the plurality of the first aggregated QoE ratings determined over the first aggregation length of time or the second aggregated QoE ratings determined over the second aggregation length of time, wherein each of the plurality of indications have different indicators for different ones of the plurality of predefined QoE ratings;

wherein the plurality of predefined QoE ratings comprise:
  a first QoE rating associated with a normal service quality when the compound service parameter is within a first threshold range during the first or second aggregation length of time;
  a second QoE rating associated with a second service quality when the compound service parameter is within a second threshold range during the first or second aggregation length of time, which is less likely to be indicative of a problem with the IPTV service provided to the subscriber than a third service quality; and
  the third QoE rating associated with a third service quality, when the compound service parameter is outside of the first threshold range and second threshold range during the first or second aggregation length of time, which is likely to be indicative of a problem with the IPTV service provided to the subscriber.

2. The method of claim 1, wherein the received service parameter values are received from two or entities selected from:
  a residential gateway of the subscriber;
  a set top box of the subscriber; and
  an access network system.

3. The method of claim 1, wherein service parameter values of the first service parameter and service parameter values of the second service parameter are received from different entities.

4. The method of claim 1, further comprising:
  determining a third aggregated QoE rating based on a plurality of second aggregated QoE ratings from a third aggregation length of time that is an integer multiple of the second aggregation length of time;
  storing the determined the third aggregated QoE ratings in the database.

5. The method of claim 1, wherein:
  the defined length of time of the collection intervals is 15 minutes;
  the first aggregation length of time is one day;
  the second aggregation length of time is one week; and
  the third aggregation length of time is one month.

6. The method of claim 1, wherein the plurality of predefined QoE ratings further comprise:
  a fourth QoE rating associated the second service quality or the third service quality during a collection interval that occurred during a specified viewing period.

7. The method of claim 1, further comprising:
  after a retention period of time, deleting from the database one or more of:
    one or more of the received service parameter values;
    one or more of the determined collection interval QoE ratings;
    one or more of the first aggregation QoE ratings; and
    one or more of the second aggregation QoE ratings.

8. The method of claim 7, wherein deleting from the database one or more of the received service parameter values comprises deleting service parameter values collected during a collection interval determined to have the first QoE rating and maintaining in the database service parameter values collected during a collection interval determined to have the third QoE rating.

9. The method of claim 1, wherein the user interface comprises one or more of charts, tables, lists, and graphical representations of selected portions of QoE data stored in the database.

10. A system for assessing a quality of experience (QoE) of an internet protocol television (IPTV) service provided to a subscriber, the system comprising:
  an interface for receiving and transmitting data;
  a processor for executing instructions; and
  a memory storing instructions, which when executed by the processor configure the system to perform a method comprising:
    receiving via the interface a plurality of service parameter values of at least a first service parameter and a second service parameter, each of the service parameter values representative of the first service parameter or the second service parameter collected during a respective one of a plurality of collection intervals of a defined length of time, the service parameter values received from one or more of:
      a residential gateway of the subscriber;
      a set top box of the subscriber; and
      an access network system;
    determining a collection interval quality of experience (QoE) rating for each of the collection intervals based on the received service parameter values collected during the respective collection interval, each of the determined collection interval QoE ratings being one of a plurality of predefined QoE ratings, wherein determining the collection interval quality of experience (QoE) rating for each of the collection intervals comprises:
      determining a compound service parameter value representative of a ratio of the first service parameter value to the second service parameter value, wherein the ratio is at least one of:
        number of discarded packets received (DISC_RCVD) to the number of holes (HOLES);
        DISC_RCVD to the number of packets requested (REQ);
        number of discarded packets sent (DISC_SENT) to HOLES;
        DISC_SENT to REQ;
        far end code violations (FE_CV) to the far end errored seconds (FE ES);
        FE_CV to the far end severely errored seconds (FE SESM);
        FE_CV to HOLES;
        FE_CV to REQ:
        near end code violations (NE_CV) to the near end errored seconds (NE_ES);
        NE_CV to the near end severely errored seconds (NE_SESM);

NE_CV to HOLES; and
NE_CV to REQ; and
determining the collection interval QoE rating based on the compound service parameter value;
storing the determined collection interval QoE ratings and the received service parameter values for the plurality of collection intervals in a database;
determining first aggregated QoE ratings each based on a plurality of collection interval QoE ratings from a first aggregation length of time that is an integer multiple of the determined length of time of the collection interval;
storing the determined the first aggregated QoE ratings in the database;
determining a second aggregated QoE rating based on a plurality of first aggregated QoE ratings from a second aggregation length of time that is an integer multiple of the first aggregation length of time;
storing the determined the second aggregated QoE ratings in the database; and
generating a user interface comprising a plurality of indications of data stored in the database, each of the plurality of indications representing one of the plurality of the first aggregated QoE ratings determined over the first aggregation length of time or the second aggregated QoE ratings determined over the second aggregation length of time, wherein each of the plurality of indications have different indicators for different ones of the plurality of predefined QoE ratings;
wherein the plurality of predefined QoE ratings comprise:
a first QoE rating associated with a normal service quality when the compound service parameter is within a first threshold range during the first or second aggregation length of time;
a second QoE rating associated with a second service quality when the compound service parameter is within a second threshold range during the first or second aggregation length of time, which is less likely to be indicative of a problem with the IPTV service provided to the subscriber than a third service quality; and
the third QoE rating associated with a third service quality when the compound service parameter is outside of the first threshold range and second threshold range during the first or second aggregation length of time, which is likely to be indicative of a problem with the IPTV service provided to the subscriber.

11. The system of claim 10, wherein the received service parameter values are received from two or entities selected from:
a residential gateway of the subscriber;
a set top box of the subscriber; and
an access network system.

12. The system of claim 10, wherein service parameter values of the first service parameter and service parameter values of the second service parameter are received from different entities.

13. The system of claim 10, wherein the instructions stored in memory further comprise instructions which when executed further configure the system to:
determine a third aggregated QoE rating based on a plurality of second aggregated QoE ratings from a third aggregation length of time that is an integer multiple of the second aggregation length of time;
store the determined the third aggregated QoE ratings in the database.

14. The system of claim 13, wherein:
the defined length of time of the collection intervals is 15 minutes;
the first aggregation length of time is one day;
the second aggregation length of time is one week; and
the third aggregation length of time is one month.

15. The system of claim 10, wherein the plurality of predefined QoE ratings further comprise:
a fourth QoE rating associated the second service quality or the third service quality during a collection interval that occurred during a specified viewing period.

16. The system of claim 10, further comprising:
after a retention period of time, deleting from the database one or more of:
one or more of the received service parameter values;
one or more of the determined collection interval QoE ratings;
one or more of the first aggregation QoE ratings; and
one or more of the second aggregation QoE ratings.

17. The system of claim 16, wherein deleting from the database one or more of the received service parameter values comprises deleting service parameter values collected during a collection interval determined to have the first QoE rating and maintaining in the database service parameter values collected during a collection interval determined to have the third QoE rating.

* * * * *

UNITED STATES PATENT AND TRADEMARK OFFICE
CERTIFICATE OF CORRECTION

PATENT NO. : 10,700,953 B2
APPLICATION NO. : 16/378066
DATED : June 30, 2020
INVENTOR(S) : Michael H. Desroches et al.

It is certified that error appears in the above-identified patent and that said Letters Patent is hereby corrected as shown below:

In the Specification

Line 6 of Column 9 remove "FUN" and insert --FTTN-- in its place

Line 59 of Column 10 remove "28," and insert --28x-- in its place

Line 64 of Column 50 remove "fails" and insert --falls-- in its place

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*